(12) United States Patent
Zhang et al.

(10) Patent No.: US 10,142,642 B2
(45) Date of Patent: Nov. 27, 2018

(54) BLOCK ADAPTIVE COLOR-SPACE CONVERSION CODING

(71) Applicant: QUALCOMM Incorporated, San Diego, CA (US)

(72) Inventors: Li Zhang, San Diego, CA (US); Jianle Chen, San Diego, CA (US); Joel Sole Rojals, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 14/729,486

(22) Filed: Jun. 3, 2015

(65) Prior Publication Data

US 2015/0358631 A1    Dec. 10, 2015

Related U.S. Application Data

(60) Provisional application No. 62/007,860, filed on Jun. 4, 2014.

(51) Int. Cl.

| | |
|---|---|
| *H04N 7/50* | (2006.01) |
| *H04N 19/44* | (2014.01) |
| *H04N 19/52* | (2014.01) |
| *H04N 19/61* | (2014.01) |
| *H04N 19/86* | (2014.01) |
| *H04N 19/573* | (2014.01) |
| *H04N 19/577* | (2014.01) |

(Continued)

(52) U.S. Cl.
CPC ........... *H04N 19/44* (2014.11); *H04N 19/117* (2014.11); *H04N 19/124* (2014.11); *H04N 19/159* (2014.11); *H04N 19/176* (2014.11); *H04N 19/186* (2014.11); *H04N 19/52* (2014.11); *H04N 19/573* (2014.11); *H04N 19/577* (2014.11); *H04N 19/593* (2014.11); *H04N 19/61* (2014.11); *H04N 19/82* (2014.11); *H04N 19/86* (2014.11); *H04N 19/91* (2014.11)

(58) Field of Classification Search
CPC ..................................................... H04N 19/44
USPC .................................................... 375/240.16
See application file for complete search history.

(56) References Cited

U.S. PATENT DOCUMENTS

| | | | | |
|---|---|---|---|---|
| 2008/0069247 | A1* | 3/2008 | He ........................ | H04N 19/865 375/240.29 |
| 2008/0165863 | A1* | 7/2008 | Yan ....................... | H04N 19/176 375/240.29 |

(Continued)

FOREIGN PATENT DOCUMENTS

WO    2008033595 A2    3/2008

OTHER PUBLICATIONS

Li et al, "Fix for Adaptive Color Space Coding in JCTVC-Q0035".*

(Continued)

*Primary Examiner* — Gims Philippe
*Assistant Examiner* — Amir Shahnami
(74) *Attorney, Agent, or Firm* — Shumaker & Sieffert, P.A.

(57) ABSTRACT

A video coder decodes a coding unit (CU) of video data. In decoding the video data, the video coder determines that the CU was encoded using the color space conversion. The video coder determines the initial quantization parameter (QP), determines the final QP that is equal to a sum of the initial QP and a QP offset, and inverse quantizes, based on the final QP, a coefficient block, then reconstructs the CU based on the inverse quantized coefficient blocks.

66 Claims, 11 Drawing Sheets

(51) Int. Cl.
*H04N 19/593* (2014.01)
*H04N 19/91* (2014.01)
*H04N 19/159* (2014.01)
*H04N 19/176* (2014.01)
*H04N 19/117* (2014.01)
*H04N 19/124* (2014.01)
*H04N 19/186* (2014.01)
*H04N 19/82* (2014.01)

(56) References Cited

U.S. PATENT DOCUMENTS

| | | | |
|---|---|---|---|
| 2010/0086025 A1* | 4/2010 | Chen | H04N 19/176 375/240.03 |
| 2013/0101024 A1* | 4/2013 | Van der Auwera | H04N 19/117 375/240.03 |
| 2013/0259141 A1 | 10/2013 | Van Der Auwera et al. | |
| 2013/0329785 A1* | 12/2013 | Lim | H04N 19/463 375/240.03 |
| 2014/0003497 A1 | 1/2014 | Sullivan et al. | |
| 2014/0301474 A1 | 10/2014 | Guo et al. | |
| 2014/0301475 A1 | 10/2014 | Guo et al. | |
| 2015/0071345 A1 | 3/2015 | Tourapis et al. | |
| 2015/0085924 A1 | 3/2015 | Gamei et al. | |
| 2015/0264354 A1 | 9/2015 | Zhang et al. | |
| 2015/0264364 A1 | 9/2015 | Zhang et al. | |
| 2015/0264402 A1 | 9/2015 | Zhang et al. | |
| 2015/0264405 A1 | 9/2015 | Zhang et al. | |
| 2016/0261865 A1 | 9/2016 | Li et al. | |

OTHER PUBLICATIONS

Li et al, "CE4 Subset3: Adaptive De-Quantization Offset".*
Tourapis et al., "H.264/14496-10 AVC Reference Software Manual".*
Ikai, "CE5 related: Simplified Residual Prediction with Luma Clipping and Chroma Removal".*
Sullivan, "Editors Draft Text for Recommendation H.264: Advanced Video Coding for Generic Audiovisual Services".*
Chen et al., "CE6.a: Chroma intra prediction by reconstructed luma samples".*
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, CH, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High Efficiency Video Coding (HEVC) text specification draft 9," 11th Meeting: Shanghai, CN, Oct. 10-19, 2012, JCTVC-K1003_v7, 290 pp.
Bross et al., "High Efficiency Video Coding (HEVC) text specification draft 10 (for FDIS & Last Call)," 12th Meeting: Geneva, CH, Jan. 14-23, 2013, JCTVC-L10032_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013; 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen et al., "CE6.a.4: Chroma intra prediction by reconstructed luma samples," Mar. 16-23, 2011, No. JCTVC-E266, XP030008772, ISSN: 0000-0007, 7 pp.
Huang et al., "CE12 Subtest 1: Chroma Deblocking Filter," JCT-VC Meeting; Mpeg Meeting; Nov. 21-30, 2011; Geneva, CH; (Joint Collaborative Team on Video Coding of ISO/IEC JTC1/SC29/WG11 and ITU-T SG.16); URL: http://wftp3.itu.int/av-arch/jctvc-site/, No. JCTVC-G286, XP030110270, 4 pp.
Ikai, "CE5 related related: Simplified residual prediction with luma clipping and chroma removal," JCT-3V Meeting; Apr. 20-26, 2013; Incheon, KR; (The Joint Collaborative Team on 3d Video Coding Extension Development of ISO/IEC JTC1/SC29/WG11 and ITU-T SG.16); URL: http://phenix.int-evry.fr/jct2/, No. JCT3V-D0063, XP030130727, 6 pp.
Li et al., "Fix for adaptive color space coding in JCTVC-Q0035," JCT-VC Meeting; Mar. 27-Apr. 4, 2014; Valencia, ES; (Joint Collaborative Team on Video Coding of ISO/IEC JTC1/SC29/WG11 and ITU-T SG.16); URL: http://wftp3.itu.int/av-arch/jctvc-site/, No. JCTVC-Q0213-v2, XP030116172, 5 pp.
Li et al., "CE4 Subtest3: Adaptive De-Quantization Offset," JCT-VC Meeting; MPEG Meeting; Jul. 14-22, 2011; Torino, IT; (Joint Collaborative Team on Video Coding of ISG/IEC JTC1/SC29/WG11 and ITU-T SG.16 ); URL: http://wftp3.itu.int/av-arch/jctvc-site/, No. JCTVC-F119, XP030009142, 13 pp.
Norkin et al., "CE12: Ericsson's and MediaTek's deblocking filter," JCT-VC Meeting; MPEG Meeting; Jul. 14-22, 2011; Torino, IT; (Joint Collaborative Team on Video Coding of ISO/IEC JTC1/SC29/WG11 and ITU-T SG.16 ); URL: http://wftp3.ltu .i nt/a v-arch/jctvc-site/, No. JCTVC-F118, XP030009141 , 6 pp.
Sharman et al., "AHG 5 and 18: Internal Precision for High Bit Depths," JCT-VC Meeting; Jul. 25-Aug. 2, 2013; Vienna, AT; (Joint Collaborative Team on Video Coding of ISO/IEC JTC1/SC29/WG11 and ITU-T SG.16); URL: http://wftp3.itu.int/av-arch/jctvc-site/, No. JCTVC-N0188-v3, XP030114677, 25 pp.
Sullivan, "Editors Draft Text for Recommendation H.264: Advanced Video Coding for Generic Audiovisual Services," ITU-T Draft; Study Period 2001-2004, International Telecommunication Union, Geneva, CH, vol. 6/16, Oct. 2002, XP017506327, 104 pp.
Tourapis et al., "H.264/14496-10 AVC Reference Software Manual Update," JVT Meeting; MPEG Meeting; Jun. 28-Jul. 3, 2009; London, UK; (Joint Video Team of ISOIIEC JTC1/SC29/WG11 and ITU-T SG.16 ); No. JVT-AEO10, XP030007472, ISSN: 0000-0078, 89 pp.
Zhang et al., "AhG8: In-loop color-space transform," JCT-VC Meeting; Mar. 27-Apr. 4, 2014; Valencia, ES; (Joint Collaborative Team on Video Coding of ISO/IEC JTC1/SC29/WG11 and ITU-T SG.16); URL: http://wftp3.itu.int/av-arch/jctvc-site/, No. JCTVC-Q0112-v2, 7 pp., XP030116031.
Zhang et al., "SCCE5 Test 3.2.1: In-loop color-space transform," JCT-VC Meeting; Jun. 30-Jul. 9, 2014; Sapporo, JP; (Joint Collaborative Team on Video Coding of ISO/IEC JTC1/SC29/WG11 and ITU-TSG.16 ); URL: http://wftp3.itu.int/av-arch/jctvc-site/, No. JCTVC-R0147, XP030116426, 8 pp.
Invitation to Pay Additional Fees from International Application No. PCT/US2015/034249 dated Aug. 10, 2015, 8 pp.
International Search Report and Written Opinion from International Application No. PCT/US2015/034249, dated Oct. 26, 2015, 23 pp.

(56) References Cited

OTHER PUBLICATIONS

Wang, et al., "High Efficiency Video Coding (HEVC) Defect Report 4," Joint Collaboration Team of Video Coding, ITU-TSG 16 WP 3 and ISO/IEC JTC 1/SC 29/WG 11, Mar. 27-Apr. 4, 2014, Document JCTVC-Q.1003 (V.1), 314 pp. [uploaded in parts].

Joshi et al., "Screen content coding test model1 (SCM 1)," 17th Meeting; Valencia, ES, Mar. 27 through Apr. 4, 2014, JCTVC-Q1014, 5 pp.

Kawamura et al., "AHG7: In-loop color-space transformation of residual signals for range extensions," (Joint 32 Collaborative Team on Video Coding of ITU-T SG.16 WP 3 and ISO/IEC JTC1/SC29/WG11); Document: JCTVC-L0371, Jan. 14-23, 2013, 4 pp.

Flynn et al., "High Efficiency Video Coding (HEVC) Range Extensions text specification: Draft 6," (Joint 31 Collaborative Team on Video Coding of ITU-T SG.16 WP 3 and ISO/IEC JTC1/SC29/WG11); Document: JCTVC-P1005_v1, Jan. 9-17, 2014, 356 pp. [uploaded in parts].

Response to International Search Report and Written Opinion dated Oct. 26, 2015, from International Application No. PCT/US2015/034249, filed Mar. 22, 2016, 6 pp.

Second Written Opinion dated Jun. 10, 2016, from International Application No. PCT/US2015/034249, 12 pp.

Response to Second Written Opinion dated Jun. 10, 2016, from International Application No. PCT/US2015/034249, filed Aug. 5, 2016, 8 pp.

International Preliminary Report on Patentability from International Application No. PCT/US2015/034249, dated Oct. 11, 2016, 14 pp.

Li B., et al., "Description of screen content coding technology proposal by Microsoft," 17. JCT-VC Meeting; Mar. 27, 2014-Apr. 4, 2014; Valencia, ES (Joint Collaborative Team on Video Coding of ISO/IEC JTC1/SC29/WG11 and ITU-T SG.16); URL: http://wftp3.itu.int/av-arch/jctvc-site/, No. JCTVC-Q0035-v2, Mar. 27, 2014 (Mar. 27, 2014), pp. 1-27, XP030115924.

* cited by examiner

BLOCK ADAPTIVE COLOR-SPACE CONVERSION CODING

This application claims the benefit of U.S. Provisional Application No. 62/007,860, filed Jun. 4, 2014, the entire content of which is incorporated herein by reference.

TECHNICAL FIELD

The disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard and extensions of such standards presently under development. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, the disclosure describes techniques for coding video blocks using a color-space conversion process. A video encoder encodes a coding unit (CU) of the video data. In encoding the video data, the video encoder determines whether to encode the CU using a color space conversion. For a color component, the video encoder determines an initial quantization parameter (QP) for the color component, sets a final QP for the color component based on the CU being encoded using the color space conversion such that the final QP for the color component is equal to a sum of the initial QP of the color component and a non-zero QP offset for the color component, and quantizes, based on the final QP for the color component, a coefficient block for the CU, the coefficient block for the CU being based on sample values of the color component. The video encoder further outputs a video data bitstream comprising one or more entropy encoded syntax elements representative of each of the quantized coefficient blocks. A video decoder decodes the CU of the video data. In decoding the video data, the video decoder determines that the CU was encoded using the color space conversion. For the color component, the video decoder determines the initial QP for the color component, determines the final QP, and inverse quantizes, based on the final QP for the color component, a coefficient block for the CU, the coefficient block for the CU being based on sample values of the color component. The video decoder reconstructs the CU based on the inverse quantized coefficient blocks for the CU.

In one example, the disclosure is directed to a method of decoding video data, the method comprising: determining that a coding unit (CU) of the video data was encoded using a color space conversion; determining an initial quantization parameter (QP) for the color component; based on the CU being encoded using the color space conversion, determining a final QP for the color component such that the final QP for the color component is equal to a sum of the initial QP of the color component and a non-zero QP offset for the color component; and inverse quantizing, based on the final QP for the color component, a coefficient block for the CU, the coefficient block for the CU being based on sample values of the color component; and reconstructing the coding unit based on the inverse quantized coefficient blocks for the CU.

In another example, the disclosure is directed to a device for decoding video data, the device comprising: a memory configured to store the video data; and one or more processors configured to: determine that a coding unit (CU) of the video data was encoded using a color space conversion; determine an initial quantization parameter (QP) for the color component; based on the CU being encoded using the color space conversion, determine a final QP for the color component such that the final QP for the color component is equal to a sum of the initial QP of the color component and a non-zero QP offset for the color component; and inverse quantize, based on the final QP for the color component, a coefficient block for the CU, the coefficient block for the CU being based on sample values of the color component; and reconstructing the coding unit based on the inverse quantized coefficient blocks for the CU.

In another example, the disclosure is directed to a device for decoding video data, the device comprising: means for determining that a coding unit (CU) of the video data was encoded using a color space conversion; means for determining an initial quantization parameter (QP) for the color component; based on the CU being encoded using the color space conversion, means for determining a final QP for the color component such that the final QP for the color component is equal to a sum of the initial QP of the color component and a non-zero QP offset for the color component; and means for inverse quantizing, based on the final QP for the color component, a coefficient block for the CU, the coefficient block for the CU being based on sample values of the color component; and means for reconstructing the coding unit based on the inverse quantized coefficient blocks for the CU.

In another example, the disclosure is directed to a computer-readable storage medium encoded with instructions that, when executed, cause one or more processors to: determine that a coding unit (CU) of the video data was encoded using a color space conversion; determine an initial quantization parameter (QP) for the color component; based on the CU being encoded using the color space conversion, determine a final QP for the color component such that the final QP for the color component is equal to a sum of the initial QP of the color component and a non-zero QP offset for the color component; and inverse quantize, based on the final QP for the color component, a coefficient block for the CU, the coefficient block for the CU being based on sample values of the color component; and reconstructing the coding unit based on the inverse quantized coefficient blocks for the CU.

In another example, the disclosure is directed to a method of encoding video data, the method comprising: determining to encode a coding unit (CU) of the video data using a color space conversion; determining an initial quantization parameter (QP) for the color component; based on the CU being encoded using the color space conversion, setting a final QP for the color component such that the final QP for the color component is equal to a sum of the initial QP of the color component and a non-zero QP offset for the color component; and quantizing, based on the final QP for the color component, a coefficient block for the CU, the coefficient block for the CU being based on sample values of the color component; and outputting a video data bitstream comprising one or more entropy encoded syntax elements representative of each of the quantized coefficient blocks.

In another example, the disclosure is directed to a device for encoding video data, the device comprising: a memory configured to store the video data; and one or more processors configured to: determine to encode a coding unit (CU) of the video data using a color space conversion; determine an initial quantization parameter (QP) for the color component; based on the CU being encoded using the color space conversion, set a final QP for the color component such that the final QP for the color component is equal to a sum of the initial QP of the color component and a non-zero QP offset for the color component; and quantize, based on the final QP for the color component, a coefficient block for the CU, the coefficient block for the CU being based on sample values of the color component; and output a video data bitstream comprising one or more entropy encoded syntax elements representative of each of the quantized coefficient blocks.

In another example, the disclosure is directed to a device for encoding video data, the device comprising: means for determining to encode a coding unit (CU) of the video data using a color space conversion; means for determining an initial quantization parameter (QP) for the color component; based on the CU being encoded using the color space conversion, means for setting a final QP for the color component such that the final QP for the color component is equal to a sum of the initial QP of the color component and a non-zero QP offset for the color component; and means for quantizing, based on the final QP for the color component, a coefficient block for the CU, the coefficient block for the CU being based on sample values of the color component; and means for outputting a video data bitstream comprising one or more entropy encoded syntax elements representative of each of the quantized coefficient blocks.

In another example, the disclosure is directed to a computer-readable storage medium encoded with instructions that, when executed, cause one or more processors to: determine to encode a coding unit (CU) of the video data using a color space conversion; determine an initial quantization parameter (QP) for the color component; based on the CU being encoded using the color space conversion, set a final QP for the color component such that the final QP for the color component is equal to a sum of the initial QP of the color component and a non-zero QP offset for the color component; and quantize, based on the final QP for the color component, a coefficient block for the CU, the coefficient block for the CU being based on sample values of the color component; and output a video data bitstream comprising one or more entropy encoded syntax elements representative of each of the quantized coefficient blocks.

The details of one or more examples of the disclosure are set forth in the accompanying drawings and the description below. Other features, objects, and advantages of the disclosure will be apparent from the description, drawings, and claims.

DETAILED DESCRIPTION

Figure 1:
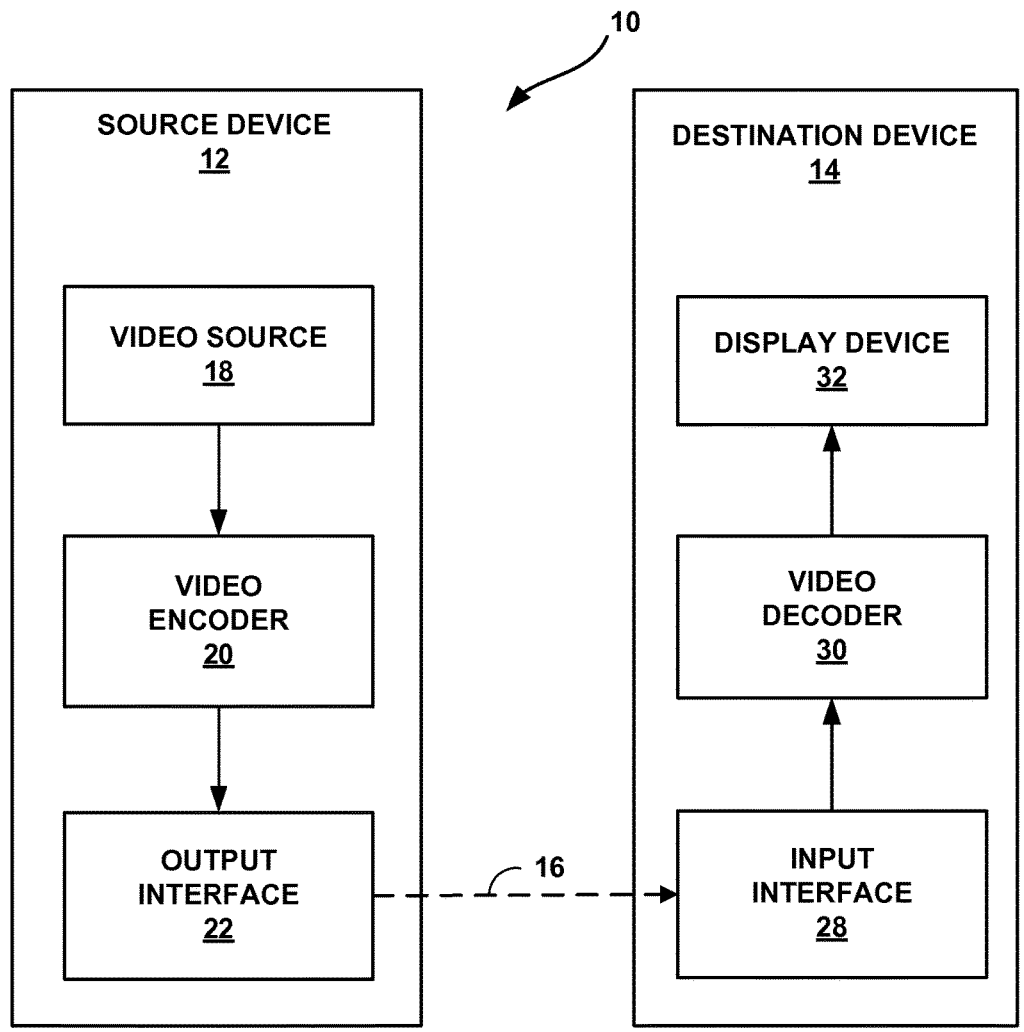
FIG. 1 is a block diagram illustrating an example video encoding and decoding system that may utilize the techniques described in this disclosure.

This disclosure describes video coding techniques, including techniques related to screen content coding (SCC) and range extensions (RCEx). The SCC and range extensions include the support of possibly high bit depth (more than 8 bit), or high chroma sampling formats. More specifically, in this disclosure, techniques related to determining quantization parameters (QPs) when color-space conversion is used are proposed.

In accordance with techniques of the disclosure, a video coder uses a final QP for a color component to quantize a block of residual data for the color component. The video coder uses a delta QP for the color component to derive the final QP for a color component. In examples with 3 color components, the delta QPs for the 3 color components may be denoted $deltaQP_{C0}$, $deltaQP_{C1}$, and $deltaQP_{C2}$. In the above examples, $deltaQP_{C0}$ may be equal to $deltaQP_{C1}$, which are both smaller than $deltaQP_{C2}$. For instance, $deltaQP_{C0}$ and $deltaQP_{C1}$ may each be equal to −5 and $deltaQP_{C2}$ may be equal to −3. In other cases, when the CU was not coded using color-space conversion, the video coder may decode the CU without adding any offsets to the determined quantization parameters, i.e., the initialized/preliminary quantization parameter.

If the video coder uses an in-loop color-space transform to code a block of residual data, for each color component, the video coder may add a delta QP to a preliminary QP for the color component. The preliminary QPs for the color component may be denoted $Qp'_y$, $Qp'_{cb}$, and $Qp'_{cr}$. The video coder may derive the preliminary QPs for the color components using the conventional QP derivation process. If the video coder does not use the in-loop color-space transform to code the block of residual data for the particular color component, the video coder does not add the delta QP for the particular color component to the preliminary QP for the particular color component.

In general, the disclosure describes techniques for coding video blocks using a color-space conversion process to code video data. The techniques described herein may improve the coding performance of in-loop color-space transform and may reduce the decoder complexity. A video encoder encodes a coding unit (CU) of the video data. In encoding the video data, the video encoder determines whether to encode the CU using a color space conversion. The video encoder may determine an initial QP for a color component and may set a final QP for the color component based on the CU being encoded using the color space conversion such that the final QP for the color component is equal to a sum of the initial QP of the color component and a non-zero QP offset for the color component. The video encoder may quantize, based on the final QP for the color component, a coefficient block for the CU, the coefficient block for the CU being based on sample values of the color component. Once each coefficient has been quantized, the video encoder further outputs the CU based on the quantized coefficient blocks for the CU in an encoded bitstream.

Furthermore, in accordance within a technique of this disclosure, a video decoder decodes a CU of video data. In decoding the video data, the video decoder determines that the CU was encoded using the color space conversion. For a color component of the plurality of color components, the video decoder may determine the initial QP for the color component and determine the final QP. The video decoder may inverse quantize, based on the final QP for the color component, a coefficient block for the CU, the coefficient block for the CU being based on sample values of the color component. Once each coefficient block has been inverse quantized, the video decoder reconstructs the CU based on the inverse quantized coefficient blocks for the CU.

FIG. 1 is a block diagram illustrating an example video encoding and decoding system 10 that may utilize techniques for screen content coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, source device 12 may output encoded data may be output to a storage device. Similarly, an input interface may access encoded data from the storage device. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for encoding video blocks using a color-space conversion process. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding video blocks using a color-space conversion process may be performed by any digital video encoding and/or decoding device. Although generally the techniques of this disclosure are performed by a video coding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a device. A device including video encoder 20 and/or video decoder 30 may comprise an integrated circuit, a microprocessor, and/or a wireless communication device, such as a cellular telephone.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). Video encoder 20 and video decoder 30 may operate according to a video coding standard, such as the HEVC, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263.

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

The JCT-VC developing the HEVC standard. The HEVC standardization efforts are based on an evolving model of a video coder referred to as the HEVC Test Model (HM). The HM presumes several additional capabilities of video coders relative to existing devices according to, e.g., ITU-T H.264/ AVC. For example, whereas H.264 provides nine intra-prediction encoding modes, the HM may provide as many as thirty-three intra-prediction encoding modes.

In general, the working model of the HM describes that a video frame or picture may be divided into a sequence of coding tree units (CTUs). CTUs may also be referred to as treeblocks or largest coding units (LCU). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. Syntax data within a bitstream may define a size for the LCU, which is a largest coding unit in terms of the number of pixels.

In HEVC, the largest coding unit in a slice is called a coding tree block (CTB). A CTB contains a quad-tree, the nodes of which are called coding units (CUs). The size of a CTB can range from 16×16 to 64×64 in the HEVC main profile, although smaller sizes, such as 8×8 CTB sizes, and larger sizes can also be supported.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions.

A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU can be the same size of a CTB and can be as small as 8×8. Each CU is coded with one prediction mode. When a CU is coded using an inter prediction mode (i.e., when the CU is inter coded), the CU may be further partitioned into two or more prediction units (PUs). In other examples, a CU may include just one PU when further partitions do not apply. In examples where a CU is partitioned into two PUs, each PU can be rectangles with a size equal to half of the CU, or two rectangles with ¼ or ¾ size of the CU. In HEVC, the smallest PU sizes are 8×4 and 4×8.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

HEVC specifies four transform units (TUs) sizes of 4×4, 8×8, 16×16, and 32×32 to code the prediction residual. A CU may be recursively partitioned into 4 or more TUs. TUs may use integer basis functions that are similar to the discrete cosine transform (DCT). Further, in some examples, 4×4 luma transform blocks that belong to an intra coded region may be transformed using an integer transform that is derived from discrete sine transform (DST). Chroma transform blocks may use the same TU sizes as luma transform blocks.

Moreover, TUs of leaf-CUs may also be associated with quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

When the CU is inter coded, one set of motion information may be present for each PU. In some examples, such as when the PU is located in a B-slice, two sets of motion information may be present for each PU. Further, each PU may be coded with a unique inter-prediction mode to derive the set of motion information for each PU.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the slice. Video encoder 20 typically operates on video blocks within individual video slices in order to encode the video data. A video block may correspond to a coding node within a CU. The video blocks may have fixed or varying sizes, and may differ in size according to a specified coding standard.

Figure 2:
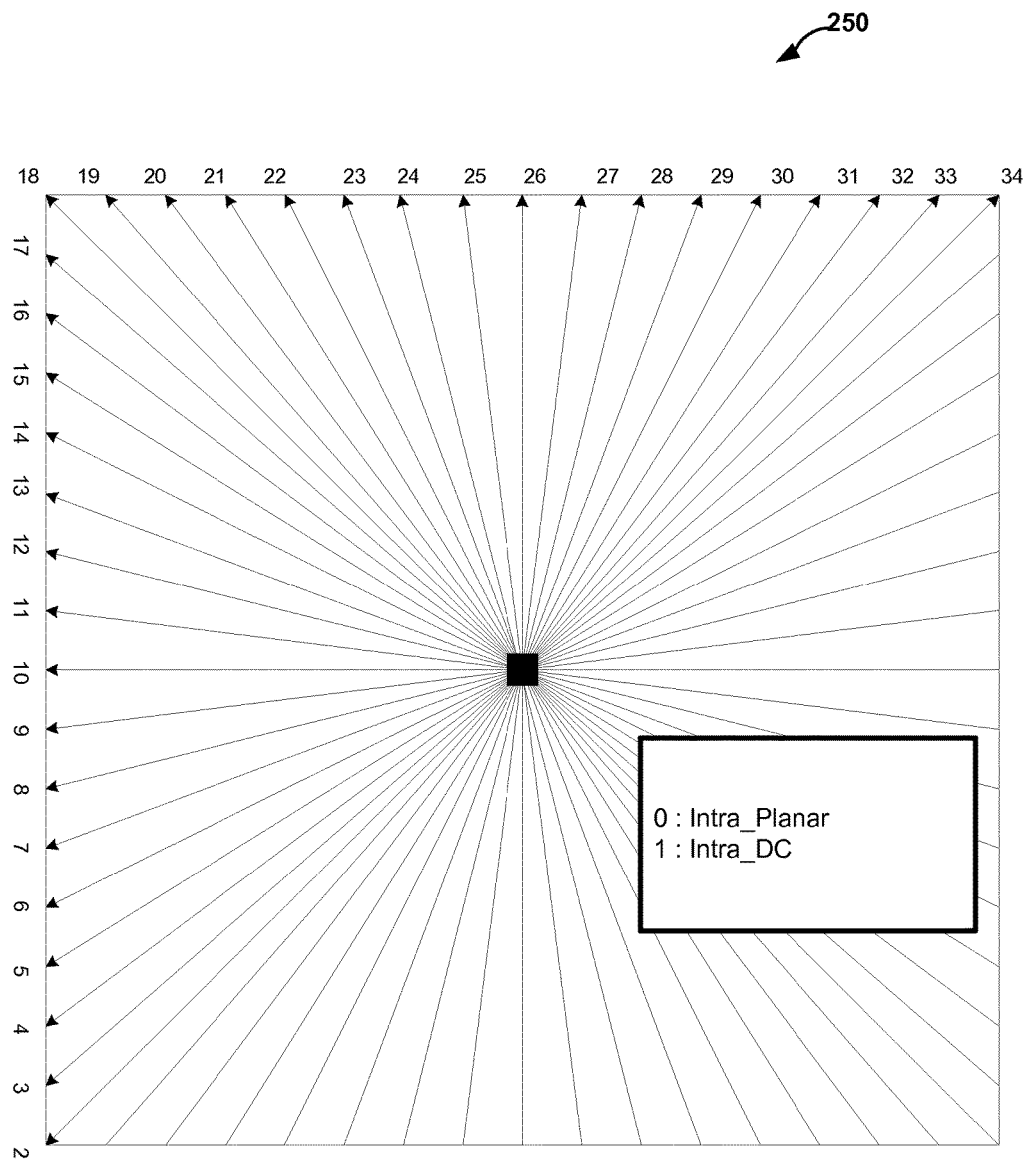
FIG. 2 is a conceptual diagram illustrating High Efficiency Video Coding (HEVC) intra prediction modes.

FIG. 2 is a conceptual diagram 250 illustrating the HEVC intra prediction modes. For the luma component of each PU, an intra prediction method is utilized with 33 angular intra prediction modes (indexed from 2 to 34), DC mode (indexed with 1) and Planar mode (indexed with 0), as described with respect to FIG. 2.

In addition to the above 35 intra prediction modes, one more intra prediction mode, named intra pulse code modulation (I-PCM), is also employed by HEVC. In I-PCM mode, prediction, transform, quantization, and entropy coding are bypassed while the prediction samples are coded by a predefined number of bits. The main purpose of the I-PCM mode is to handle the situation when the signal cannot be efficiently coded by other intra prediction modes.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may use a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode syntax elements representing transform coefficients in the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL unit may encapsulate different RBSPs for video parameter sets (VPSs), sequence parameter sets (SPSs), picture parameter sets (PPSs), coded slices, supplemental enhancement information (SEI), and so on. NAL units that encapsulate RBSPs for video coding data (as opposed to RBSPs for parameter sets and SEI messages) may be referred to as video coding layer (VCL) NAL units. In HEVC (i.e., non-multi-layer HEVC), an access unit may be a set of NAL units that are consecutive in decoding order and contain exactly one coded picture. In addition to the coded slice NAL units of the coded picture, the access unit may also contain other NAL units not containing slices of the coded picture. In some examples, the decoding of an access unit always results in a decoded picture. Supplemental Enhancement Information (SEI) contains information that is not necessary to decode the samples of coded pictures from VCL NAL units. An SEI RBSP contains one or more SEI messages.

As briefly indicated above, NAL units may encapsulate RBSPs for VPSs, SPSs, and PPSs. A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In the HEVC standard, there are two inter prediction modes. These inter prediction modes are merge mode (note that skip mode is considered as a special case of merge mode) and advanced motion vector prediction (AMVP) mode, respectively, for a prediction unit (PU). In either AMVP or merge mode, a motion vector (MV) candidate list may be maintained for multiple motion vector predictors. The motion vector(s), as well as reference indices in the merge mode, of the current PU may be generated by taking one candidate from the MV candidate list.

In some instances, the MV candidate list may contain up to 5 candidates for the merge mode and only two candidates for the AMVP mode. A merge candidate may contain a set of motion information, e.g., motion vectors corresponding to both reference picture lists (such as list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate may contain only a motion vector. In AMVP mode, the predicted motion vectors can be further refined.

A merge candidate may correspond to a full set of motion information while an AMVP candidate may contain just one motion vector for a specific prediction direction and reference index. The candidates for both modes may be similarly derived from the same spatial and temporal neighboring blocks.

Figure 3B:
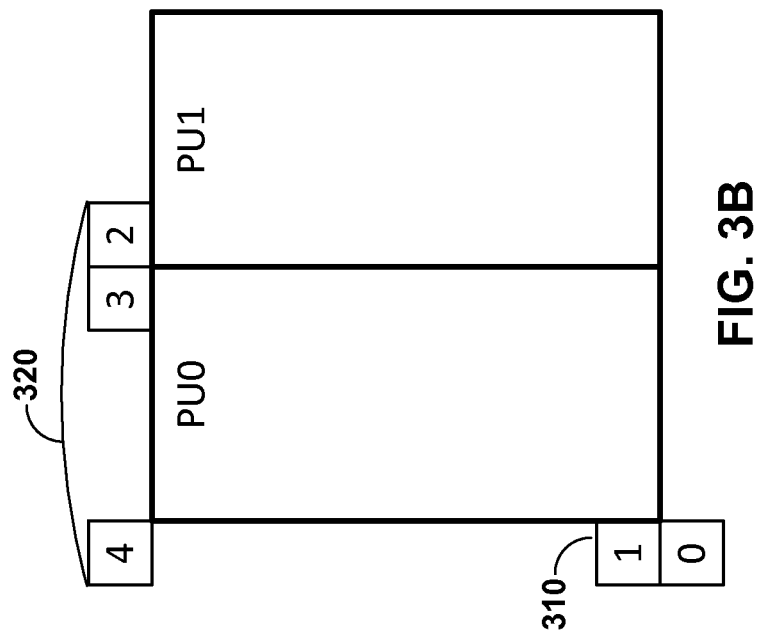
FIG. 3A and FIG. 3B are conceptual diagrams illustrating spatial neighboring motion vector candidates for merge and advanced motion vector prediction (AMVP) modes according to one or more techniques of the current disclosure.
Figure 3A:
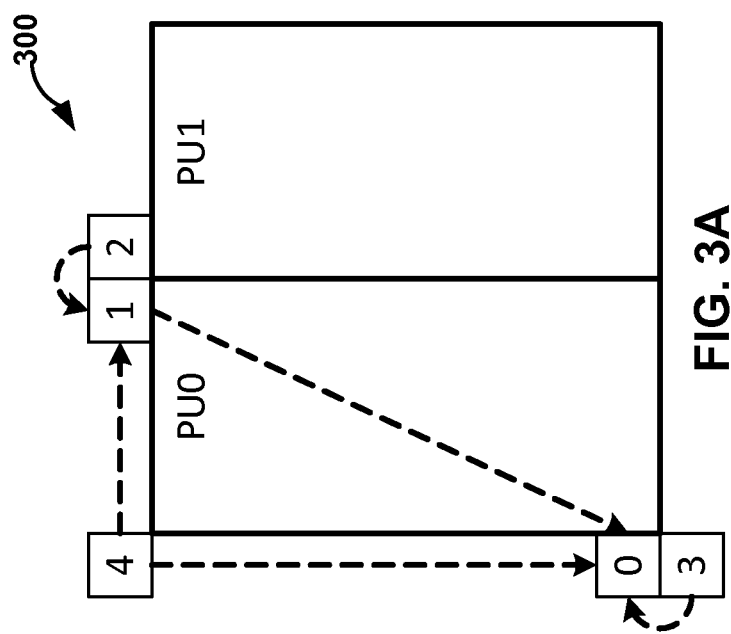

FIG. 3A and FIG. 3B are conceptual diagrams illustrating spatial neighboring motion vector candidates for merge and advanced motion vector prediction (AMVP) modes according to one or more techniques of the current disclosure. As described with respect to FIG. 3A and FIG. 3B, spatial MV candidates are derived from the neighboring blocks shown in FIG. 3A and FIG. 3B, for a specific PU (PU0), although the methods generating the candidates from the blocks differ for merge and AMVP modes.

In merge mode, up to four spatial MV candidates can be derived with the orders shown in FIG. 3A with numbers, and the order is the following: left (0), above (1), above right (2), below left (3), and above left (4), as shown in FIG. 3A.

In AMVP mode, the neighboring blocks are divided into two groups: left group 310 consisting of the block 0 and 1, and above group 320 consisting of the blocks 2, 3, and 4 as shown in FIG. 3B. For each group 310 and 320, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate is scaled to form the final candidate, thus the temporal distance differences can be compensated.

Many applications, such as remote desktop, remote gaming, wireless displays, automotive infotainment, cloud computing, etc., are becoming routine in daily lives. Video contents in these applications are usually combinations of natural content, text, artificial graphics, etc. In text and artificial graphics region, repeated patterns (such as characters, icons, symbols, etc.) often exist. Intra Block Copying (Intra BC) is a technique which may enable a video coder to remove such redundancy and improve intra-picture coding efficiency. In some instances, Intra BC alternatively may be referred to as Intra motion compensation (MC).

According to some Intra BC techniques, video coders may use blocks of previously coded video data, within the same picture as the current block of video data, that are either directly above or directly in line horizontally with a current block (to be coded) of video data in the same picture for prediction of the current block. In other words, if a picture of video data is imposed on a 2-D grid, each block of video data would occupy a unique range of x-values and y-values. Accordingly, some video coders may predict a current block of video data based on blocks of previously coded video data that share only the same set of x-values (i.e., vertically in-line with the current block) or the same set of y-values (i.e., horizontally in-line with the current block).

Figure 4:
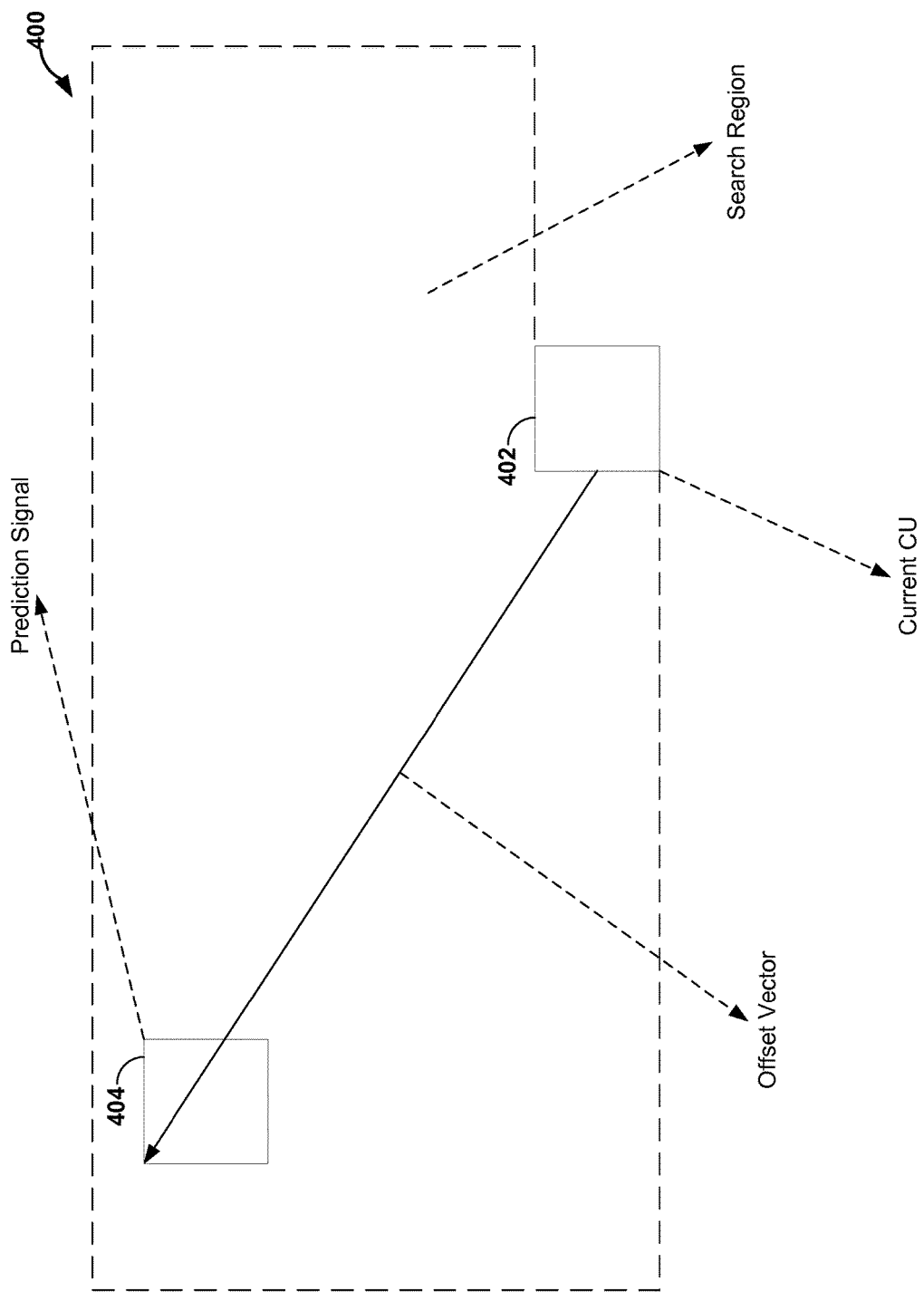
FIG. 4 is a conceptual diagram illustrating an intra block copy (BC) example according to one or more techniques of the current disclosure.

FIG. 4 is a conceptual diagram illustrating an intra block copy (BC) example according to one or more techniques of the current disclosure. As described with respect to FIG. 4, the Intra BC has been included in RExt. An example of Intra BC is shown as in FIG. 4, wherein a current CU 402 is predicted from an already decoded block 404 of the current picture/slice. The current Intra BC block size can be as large as a CU size, which ranges from 8×8 to 64×64, although some applications, further constrains may apply in addition.

In traditional video coding, images may be assumed to be continuous-tone and spatially smooth. Based on these assumptions, various tools have been developed such as block-based transform, filtering, etc., and they have shown good performance for videos with natural content. However, in certain applications, such remote desktop, collaborative work, and wireless display, computer generated screen content may be the dominant content to be compressed. This type of content tends to be discrete-tone and features sharp lines with high contrast object boundaries. However, the assumption of continuous-tone and smoothness may no longer apply. As such, traditional video coding techniques may not work efficiently.

To rectify this loss of efficiency, video coders may use palette mode coding. U.S. Provisional Application Ser. No. 61/810,649, filed Apr. 10, 2013, describe examples of the palette coding techniques. For each CU, a palette may be derived, which includes the most dominant pixel values in the current CU. The size and the elements of the palette are first transmitted. The pixels in the CUs are then encoded according to a particular scanning order. For each location, video encoder 20 may first transmit a syntax element, such as a flag, palette_flag, to indicate if the pixel value is in the palette ("run mode") or not ("pixel mode").

In "run mode", video encoder 20 may signal the palette index followed by the "run". The run is a syntax element that indicates the number of consecutive pixels in a scanning order that have the same palette index value as the pixel currently being coded. If multiple pixels in immediate succession in the scanning order have the same palette index value, then "run mode" may be indicated by the syntax element, such as palette_flag. A counter value may be determined, which equals the number of pixels succeeding the current pixel that have the same palette index value as the current pixel, and the run is set equal to the counter value. Video encoder 20 does not need to transmit either palette_flag or the palette index for the following positions that are covered by the "run," as each of the pixels following the current pixel has the same pixel value. On the decoder side, only the first palette index value for the current pixel would be decoded, and the result would be duplicated for each pixel in the "run" of pixels indicated in the "run" syntax element. In "pixel mode", video encoder 20 transmits the pixel sample value for this position. If the syntax element, such as palette_flag, indicates "pixel mode", then the palette index value is only determined for the current pixel being decoded.

An in-loop color-space transform for residual signals is proposed for sequences in 4:4:4 chroma format. The in-loop color-space transform process transforms prediction error signals (i.e., residual signals) in RGB/YUV chroma format into those in a sub-optimal color-space. The in-loop color-space transform can further reduce the correlation among the color components. The transform matrix may be derived from pixel sample values for each CU by a singular-value-decomposition (SVD). The color-space transform may be applied to prediction error of both intra mode and inter mode.

When the color-space transform is applied to inter mode, the residual is firstly converted to a different domain with the derived transform matrix. After the color-space conversion, the conventional coding steps, such as DCT/DST, quantization, and entropy coding are performed, in order.

When the color-space transform is applied to a CU coded using an intra mode, the prediction and current block are firstly converted to a different domain with the derived transform matrix, respectively. After the color-space conversion, the residual between current block and a predictor for the current block is further transformed with DCT/DST, quantized, and entropy coded.

A video encoding device, such as video encoder 20, performs a forward operation, where a color-space transform matrix comprising conversion values a, b, c, d, e, f, g, h, and i is applied to three planes G, B, and R to derive values for color components P, Q, and S as follows:

$$\begin{bmatrix} a & b & c \\ d & e & f \\ g & h & i \end{bmatrix} \begin{bmatrix} G \\ B \\ R \end{bmatrix} = \begin{bmatrix} P \\ Q \\ S \end{bmatrix}$$

Resulting values may be clipped within the range of the HEVC specification, since values may be enlarged up to $\sqrt{3}$ times in the worst case. A video decoding device, such as video decoder 30, performs an inverse operation, where a color-space transform matrix comprising conversion values a', b', c', d', e', f', g', h', and i' is applied to the three color components P', Q', and R' to derive the three planes G', B' and R' as follows, $$\begin{bmatrix} a & b & c \\ d & e & f \\ g & h & i \end{bmatrix}^t \begin{bmatrix} P' \\ Q' \\ S' \end{bmatrix} = \begin{bmatrix} G' \\ B' \\ R' \end{bmatrix}$$

Figure 5:
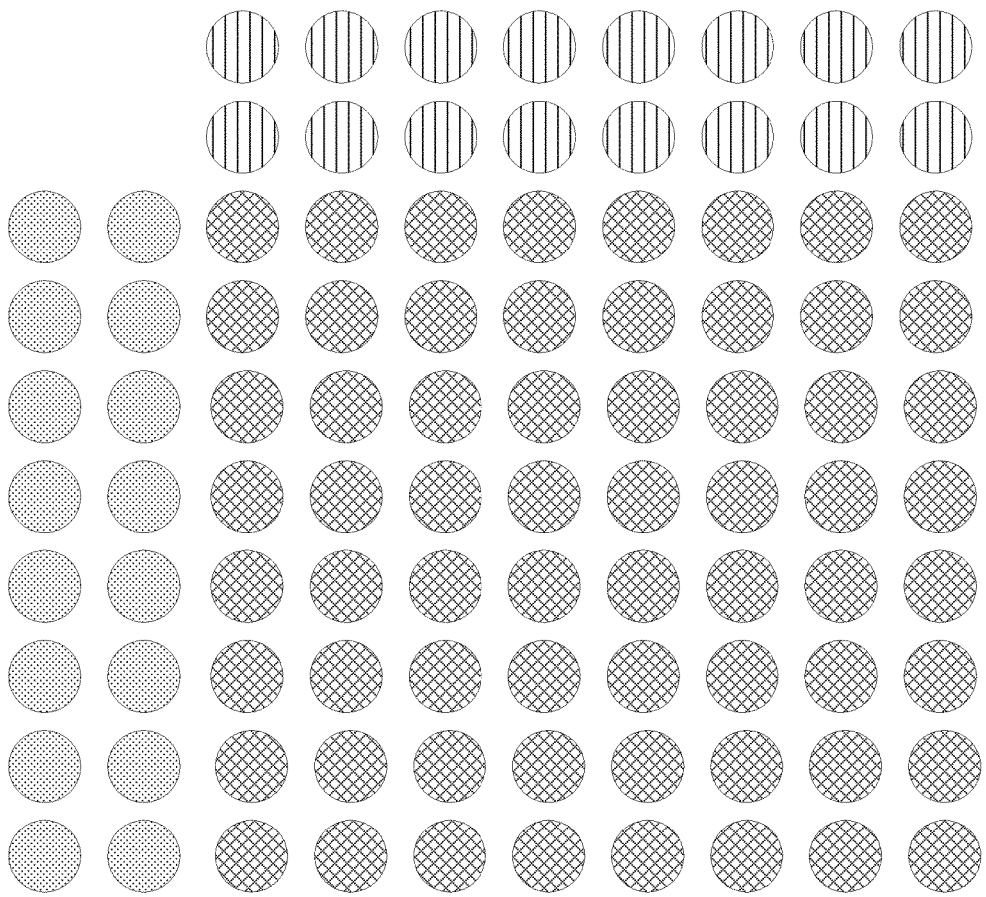
FIG. 5 is a conceptual diagram illustrating an example of a target block and reference sample for an intra 8×8 block, according to one or more techniques of the current disclosure.

FIG. 5 is a conceptual diagram illustrating an example of a target block and reference sample for an intra 8×8 block, according to one or more techniques of the current disclosure. A transform matrix may be derived using singular-value-decomposition (SVD) from the reference sample values. A video coding device may use different reference samples for the intra case and inter case. For the case of an intra coded block, the target blocks and reference samples may be as shown in FIG. 5. In FIG. 5, the target block consists of 8×8 crosshatched samples, and reference samples are striped and dotted samples.

For the case of an inter coded block, reference samples for the matrix derivation may be the same as the reference samples for motion compensation. Reference samples in the advanced motion prediction (AMP) block may be sub-sampled such that the number of reference samples is reduced. For example, the number of reference samples in a 12×16 block is reduced by ⅔.

In some examples of the above method, the color-space transform process may be always applied. Therefore, there may be no need to signal whether the color-space transform process is invoked or not. In addition, both video encoder 20 and video decoder 30 may use the same method to derive the transform matrix in order to avoid the overhead for signaling the transform matrix.

Video encoder 20 and video decoder 30 may use various color-space transform matrices. For example, video encoder 20 and video decoder 30 may apply different color-space transform matrices for different color spaces. For instance, video encoder 20 and video decoder 30 may use a pair of YCbCr transform matrixes to convert sample values from the RGB color space to the YCbCr color space and back. The following equations show one example set of YCbCr transform matrixes:

$$\text{Forward: } \begin{bmatrix} Y \\ Cb \\ Cr \end{bmatrix} = \begin{bmatrix} 0.2126 & 0.71525 & 0.0722 \\ -0.1172 & -0.3942 & 0.5114 \\ 0.5114 & -0.4645 & -0.0469 \end{bmatrix} \begin{bmatrix} R \\ G \\ B \end{bmatrix}$$

$$\text{Inverse: } \begin{bmatrix} R \\ G \\ B \end{bmatrix} = \begin{bmatrix} 1 & 0 & 1.5397 \\ 1 & -0.1831 & -0.4577 \\ 1 & 1.8142 & 0 \end{bmatrix} \begin{bmatrix} Y \\ Cb \\ Cr \end{bmatrix}$$

In another example, video encoder 20 and video decoder 30 may use a pair of YCoCg transform matrixes to convert sample values from the RGB color space to the YCoCg color space and back. The following equations show one example set of YCoCg transform matrixes:

$$\text{Forward: } \begin{bmatrix} Y \\ Co \\ Cg \end{bmatrix} = \begin{bmatrix} \frac{1}{4} & \frac{1}{2} & \frac{1}{4} \\ \frac{1}{2} & 0 & -\frac{1}{2} \\ -\frac{1}{4} & \frac{1}{2} & -\frac{1}{4} \end{bmatrix} \begin{bmatrix} R \\ G \\ B \end{bmatrix}$$

$$\text{Inverse: } \begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix}$$

Another such matrix may be the YCoCg-R matrix, which is a revisable version of the YCoCg matrix which scales the Co and Cg components by a factor of two. By using a lifting technique, video encoder 20 and video decoder 30 may achieve the forward and inverse transform by the following equations:

$$\text{Forward: } \begin{aligned} Co &= R - B \\ t &= B + \lfloor Co/2 \rfloor \\ Cg &= G - t \\ Y &= t + \lfloor Cg/2 \rfloor \end{aligned}$$

$$\text{Inverse: } \begin{aligned} t &= Y - \lfloor Cg/2 \rfloor \\ G &= Cg + t \\ B &= t - \lfloor Co/2 \rfloor \\ R &= B + Co \end{aligned}$$

In the above equations and matrices, the forward transformations may be performed before the encoding process (e.g., by a video encoder). Conversely, the inverse transformations may be performed after the decoding process (e.g., by a video decoder).

A slice header for a slice contains information about the slice. For instance, a slice header for a slice may contain syntax elements from which video decoder 30 can derive quantification parameters for the slice. In HEVC, a slice segment header syntax structure corresponds to a slice header. The following table shows a portion of a slice segment header as defined in:

| slice_segment_header( ) { | Descriptor |
|---|---|
| ... | |
| slice_qp_delta | se(v) |
| if( pps_slice_chroma_qp_offsets_present_flag ) { | |
| slice_cb_qp_offset | se(v) |
| slice_cr_qp_offset | se(v) |
| } | |
| if( chroma_qp_offset_list_enabled_flag ) | |
| cu_chroma_qp_offset_enabled_flag | u(1) |
| ... | |
| } | |

In the example above, and other syntax tables of this disclosure, syntax elements having descriptors of the form u(n), where n is a non-negative integer, are unsigned values of length n. Further, the descriptor se(v) indicates a signed integer 0-th order Exp-Golomb-coded syntax element with the left bit first.

In the table above, the slice_qp_delta syntax element specifies an initial value of $Qp_Y$ to be used for the coding blocks in the slice until modified by the value of CuQpDeltaVal in the CU layer. A $Qp_Y$ for a slice is a QP for luma components of blocks of the slice. The initial value of the $Qp_Y$ quantization parameter for the slice, $SliceQp_Y$, may be derived as follows:

$$SliceQp_Y = 26 + init\_qp\_minus26 + slice\_qp\_delta$$

In the equation above, init_qp_minus26 is a syntax element signaled in a PPS. The init_qp_minus26 syntax element specifies the initial value minus 26 of $SliceQp_Y$ for each slice. The value of $SliceQp_Y$ may be in the range of $-QpBdOffset_Y$ to +51, inclusive. $QpBdOffset_Y$ is a variable equal to a bit_depth_luma_minus8 syntax element multiplied by 6. The bit_depth_luma_minus8 syntax element specifies the bit depth of the samples of a luma array and the value of the luma quantization parameter range offset QpBd- Offset$_Y$. Video encoder 20 may signal the bit_depth_luma_minus8 syntax element in an SPS.

Another syntax element, slice_cb_qp_offset, specifies a difference to be added to the value of pps_cb_qp_offset (or the luma quantization parameter offset) when determining the value of the Qp'$_{Cb}$ quantization parameter. The value of slice_cb_qp_offset may be in the range of −12 to +12, inclusive. When slice_cb_qp_offset is not present, slice_cb_qp_offset is inferred to be equal to 0. The value of pps_cb_qp_offset+slice_cb_qp_offset may be in the range of −12 to +12, inclusive.

The syntax element slice_cr_qp_offset specifies a difference to be added to the value of pps_cr_qp_offset (or the luma quantization parameter offset) when determining the value of the Qp'$_{Cr}$ quantization parameter. The value of slice_cr_qp_offset may be in the range of −12 to +12, inclusive. When slice_cr_qp_offset is not present, slice_cr_qp_offset may be inferred to be equal to 0. The value of pps_cr_qp_offset+slice_cr_qp_offset may be in the range of −12 to +12, inclusive.

When the syntax element cu_chroma_qp_offset_enabled_flag is equal to 1, the cu_chroma_qp_offset_flag may be present in the transform unit syntax. When cu_chroma_qp_offset_enabled_flag is equal to 0, the cu_chroma_qp_offset_flag may not be present in the transform unit syntax. When not present, the value of cu_chroma_qp_offset_enabled_flag is inferred to be equal to 0.

A transform unit may have syntax as follows:

sponding CuQpDeltaVal has a negative value. When cu_qp_delta_sign_flag is not present, cu_qp_delta_sign_flag is inferred to be equal to 0.

When cu_qp_delta_abs is present, the variables IsCuQpDeltaCoded and CuQpDeltaVal may be derived as follows.

IsCuQpDeltaCoded=1

CuQpDeltaVal=cu_qp_delta_abs*(1−2*cu_qp_delta_sign_flag)

The value of CuQpDeltaVal may be in the range of −(26+QpBdOffsetY/2) to +(25+QpBdOffsetY/2), inclusive.

The syntax element cu_chroma_qp_offset_flag, when present and equal to 1, specifies that an entry in the cb_qp_offset_list[ ] is used to determine the value of CuQpOffsetCb and a corresponding entry in the cr_qp_offset_list[ ] is used to determine the value of CuQpOffsetCr. When the variable cu_chroma_qp_offset_flag is equal to 0, these lists are not used to determine the values of CuQpOffsetCb and CuQpOffsetCr.

The syntax element cu_chroma_qp_offset_idx, when present, specifies the index into the cb_qp_offset_list[ ] and cr_qp_offset_list[ ] that is used to determine the value of CuQpOffsetCb and CuQpOffsetCr. When present, the value of cu_chroma_qp_offset_idx shall be in the range of 0 to chroma_qp_offset_list_len_minus1, inclusive. When not present, the value of cu_chroma_qp_offset_idx is inferred to be equal to 0.

| transform_unit( x0, y0, xBase, yBase, log2TrafoSize, trafoDepth, blkIdx ) { | Descriptor |
|---|---|
|   log2TrafoSizeC = Max( 2, log2TrafoSize − ( ChromaArrayType = = 3 ? 0 : 1 ) ) | |
|   cbfDepthC = trafoDepth − ( ChromaArrayType != 3 && log2TrafoSize = = 2 ? 1 : 0 ) | |
| [Ed. Check case with smaller max depth.] | |
|   xC = ( ChromaArrayType != 3 && log2TrafoSize = = 2) ? xBase : x0 | |
|   yC = ( ChromaArrayType != 3 && log2TrafoSize = = 2 ) ? yBase : y0 | |
|   cbfLuma = cbf_luma[ x0 ][ y0 ][ trafoDepth ] | |
|   cbfChroma = | |
|     cbf_cb[ xC ][ yC ][ cbfDepthC ] \|\| | |
|     cbf_cr[ xC ][ yC ][ cbfDepthC ] \|\| | |
|     ( ChromaArrayType = = 2 && | |
|       ( cbf_cb[ xC ][ yC + ( 1 << log2TrafoSizeC ) ][ cbfDepthC ] \|\| | |
|       cbf_cr[ xC ][ yC + ( 1 << log2TrafoSizeC ) ][ cbfDepthC ] ) ) | |
|   if( cbfLuma \|\| cbfChroma ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|     if( cu_chroma_qp_offset_enabled_flag && cbfChroma && | |
|       !cu_transquant_bypass_flag && !IsCuChromaQpOffsetCoded ) { | |
|       cu_chroma_qp_offset_flag | ae(v) |
|       if( cu_chroma_qp_offset_flag && | |
|         chroma_qp_offset_list_len_minus1 > 0 ) | |
|         cu_chroma_qp_offset_idx | ae(v) |
|     } | |
|     if( cbfLuma ) | |
|       residual_coding( x0, y0, log2TrafoSize, 0 ) | |
|   ... | |
|   } | |
| } | |

The syntax element cu_qp_delta_abs specifies the absolute value of the difference CuQpDeltaVal between the luma quantization parameter of the current coding unit and its prediction. In the above table, the descriptor ae(v) indicates a context-adaptive arithmetic entropy-coded syntax element.

The syntax element cu_qp_delta_sign_flag specifies the sign of CuQpDeltaVal. If cu_qp_delta_sign_flag is equal to 0, the corresponding CuQpDeltaVal has a positive value. Otherwise (cu_qp_delta_sign_flag is equal to 1), the corre- The case in which the cu_chroma_qp_offset_flag is not present because the cu_chroma_qp_offset_flag was already present in some other CU of the same group and the case where the flag is equal to 1 but the index is not present because the list contains only one entry may be checked. When cu_chroma_qp_offset_flag is present, the variable IsCuChromaQpOffsetCoded is set equal to 1. The variables CuQpOffset$_{Cb}$ and CuQpOffset$_{Cr}$ are then derived. If cu_chroma_qp_offset_flag is equal to 1, then CuQpOffset$_{Cb}$=cb_qp_offset_list[cu_chroma_qp_offset_idx], and CuQpOffset$_{Cr}$=cr_qp_offset_list[cu_chroma_qp_offset_idx]. Otherwise (cu_chroma_qp_offset_flag is equal to 0), CuQpOffset$_{Cb}$ and CuQpOffset$_{Cr}$ are both set equal to 0.

In the decoding process, for the derivation process for quantization parameters, input to this process is a luma location (xCb, yCb) specifying the top-left sample of the current luma coding block relative to the top-left luma sample of the current picture. In this process, the variable Qp$_Y$, the luma quantization parameter Qp'$_Y$, and the chroma quantization parameters Qp'$_{Cb}$ and QP'$_{Cr}$ are derived.

In accordance with techniques of this disclosure, a quantization group is a set of TUs of CU, where each of the TUs shares the same QP values. The luma location (xQg, yQg), specifies the top-left luma sample of a current quantization group relative to the top left luma sample of the current picture. The horizontal and vertical positions xQg and yQg are set equal to xCb−(xCb & ((1<<Log 2 MinCuQpDeltaSize)−1)) and yCb−(yCb & ((1<<Log 2 MinCuQpDeltaSize)−1)), respectively. The luma size of a quantization group, Log 2 MinCuQpDeltaSize, determines the luma size of the smallest area inside a coding tree block that shares the same qP$_{Y\_PRED}$.

A video coder may derive the predicted luma quantization parameter qP$_{Y\_PRED}$ by the following ordered steps:

1) The variable qP$_{Y\_PREV}$ may be derived. If one or more of the following conditions are true, the video coder sets qP$_{Y\_PREV}$ equal to SliceQpY: The current quantization group is the first quantization group in a slice, the current quantization group is the first quantization group in a tile, or the current quantization group is the first quantization group in a coding tree block row and entropy_coding_sync_enabled_flag is equal to 1. Otherwise, qP$_{Y\_PREV}$ is set equal to the luma quantization parameter QpY of the last coding unit in the previous quantization group in decoding order.

2) The availability derivation process for a block in z-scan order is invoked with the location (xCurr, yCurr) set equal to (xCb, yCb) and the neighboring location (xNbY, yNbY) set equal to (xQg−1, yQg) as inputs, and the output is assigned to availableA. The variable qPY_A is derived as follows: If one or more of the following conditions are true, qPY_A is set equal to qP$_{Y\_PREV}$: availableA is equal to FALSE or the coding tree block address ctbAddrA of the coding tree block containing the luma coding block covering the luma location (xQg−1, yQg) is not equal to CtbAddrInTs, where ctbAddrA is derived as follows:

xTmp=(xQg−1)>>Log 2 MinTrafoSize yTmp=yQg>>Log 2 MinTrafoSize minTbAddrA=MinTbAddrZs[xTmp][yTmp]

ctbAddrA=(minTbAddrA>>2)*(CtbLog 2 SizeY−Log 2 MinTrafoSize)

Otherwise, qP$_{Y\_A}$ is set equal to the luma quantization parameter Qp$_Y$ of the coding unit containing the luma coding block covering (xQg−1, yQg).

3) The availability derivation process for a block in z-scan order is invoked with the location (xCurr, yCurr) set equal to (xCb, yCb) and the neighboring location (xNbY, yNbY) set equal to (xQg, yQg−1) as inputs. The output is assigned to availableB. The variable qP$_{Y\_B}$ is derived. If one or more of the following conditions are true, qP$_{Y\_B}$ is set equal to qP$_{Y\_PREV}$: availableB is equal to FALSE or the coding tree block address ctbAddrB of the coding tree block containing the luma coding block covering the luma location (xQg, yQg−1) is not equal to CtbAddrInTs, where ctbAddrB is derived as follows:

xTmp=xQg>>Log 2 MinTrafoSize yTmp=(yQg−1)>>Log 2 MinTrafoSize minTbAddrB=MinTbAddrZs[xTmp][yTmp]

ctbAddrB=(minTbAddrB>>2)*(CtbLog 2 SizeY−Log 2 MinTrafoSize)

Otherwise, qP$_{Y\_B}$ is set equal to the luma quantization parameter Qp$_Y$ of the CU containing the luma coding block covering (xQg, yQg−1).

The predicted luma quantization parameter qP$_{Y\_PRED}$ may be derived as follows:

qP$_{Y\_PRED}$=(qP$_{Y\_A}$+qP$_{Y\_B}$+1)>>1

The variable Qp$_Y$ may be derived as follows:

Qp$_Y$=((qP$_{Y\_PRED}$+CuQpDeltaVal+52+2*QpBdOffset$_Y$)%(52+QpBdOffset$_Y$))−QpbdOffset$_Y$ The luma quantization parameter Qp'$_Y$ may be derived as follows:

Qp'$_Y$=Qp$_Y$+QpBdOffset$_Y$

When ChromaArrayType is not equal to 0, the variables qPi$_{Cb}$ and qPi$_{Cr}$ are derived as follows:

qPi$_{Cb}$=Clip3(−QpBdOffset$_C$,57,Qp$_Y$+pps_cb_qp_offset+slice_cb_qp_offset+CuQpOffset$_{Cb}$)

qPi$_{Cr}$=Clip3(−QpBdOffset$_C$,57,Qp$_Y$+pps_cr_qp_offset+slice_cr_qp_offset+CuQpOffset$_{Cr}$)

If ChromaArrayType is equal to 1, the variables qP$_{Cb}$ and qP$_{Cr}$ are set equal to the value of Qp$_C$ based on the index qPi equal to qPi$_{Cb}$ and qPi$_{Cr}$, respectively. Otherwise, the variables qP$_{Cb}$ and qP$_{Cr}$ are set equal to Min(qPi, 51), based on the index qPi equal to qPi$_{Cb}$ and qPi$_{Cr}$, respectively.

The chroma quantization parameters for the Cb and Cr components, Qp'$_{Cb}$ and Qp'$_{Cr}$, are derived as follows:

Qp'$_{Cb}$=qP$_{Cb}$+QpBdOffset$_C$

Qp'$_{Cr}$=qP$_{Cr}$+QpBdOffset$_C$

The specification of Qp$_c$ as a function of qPi for ChromaArrayType equal to 1 is as follows:

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| Qp$_c$ | =qPi | 29 | 30 | 31 | 32 | 33 | 33 | 34 | 34 | 35 | 35 | 36 | 36 | 37 | 37 | =qPi − 6 |

In the de-quantization process, the quantization parameter qP for each component index (cIdx) is derived. If cIdx is equal to 0, qP=Qp'$_Y$. Otherwise, if cIdx is equal to 1, qP=Qp'$_{Cb}$. Otherwise (cIdx is equal to 2), qP=Qp'$_C$. In the deblocking filter process, the luma/chroma edges are firstly determined which are dependent on the Qp$_Y$. Sub-clause 8.7.2.5.3 and 8.7.2.5.5 of HEVC provide details of the deblocking filter process.

U.S. Provisional Patent Application 61/981,645, filed Apr. 18, 2014, defines in-loop color transform formulas, such as a normalized YCgCo transform and a YCgCo transform with bit-depth increment. In addition, U.S. Provisional Patent Application 61/981,645 described that the color transform can be applied to the residual domain for intra modes, that is, after prediction process before conventional transform/quantization process. Moreover, U.S. Provisional Patent Application 61/981,645 pointed out that different color components may use different delta QPs for blocks which are coded with color transform based on the norm of the transform.

The video coding techniques of U.S. Provisional Patent Application 61/981,645 may be improved in several ways. For instance, the fixed delta QP settings for the three color components may be not optimal for all cases, such as all intra/random access/low delay. Further, when using the non-normalized YCgCo transform with bit-depth increment, the transform results in the bit-width increase for the normal transform which increases the cost for hardware implementation. Conversely, if the normal transform is kept unchanged, it may result in overflow for some cases due to the increased precision of the input residual data.

The techniques of this disclosure provide solutions to improve the coding performance of in-loop color-space transform and reduce the decoder complexity compared to the previous designs. A video coder, such as video encoder 20 or video decoder 30, may perform any of the techniques as described with relation to FIGS. 1-11.

In some examples, the set of delta values of QPs for the three color components decoded are denoted by (deltaQP$_{C0}$, deltaQP$_{C1}$, deltaQP$_{C2}$), which indicate the offset of QPs for blocks with color transform enabled compared to qP determined with the conventional way. For blocks coded with color transform enabled, the final QP used in the de-quantization process is set to qP+deltaQP$_{C0}$, qP+deltaQP$_{C1}$, qP+deltaQP$_{C2}$ for the three color components with component index cIdx equal to 0, 1, 2, respectively. qP is the output of the conventional QP derivation process. In some examples, deltaQP$_{C0}$ is equal to deltaQP$_{C1}$, while both deltaQP$_{C0}$ and deltaQP$_{C1}$ are smaller than deltaQP$_{C2}$.

For instance, video encoder 20 may encode a CU of the video data. In encoding the video data, video encoder 20 may determine to encode the CU using a color space conversion. Video encoder 20 may determine an initial QP for the color component and set a final QP for the color component based on the CU being encoded using the color space conversion such that the final QP for the color component is equal to a sum of the initial QP of the color component and a non-zero QP offset for the color component. Video encoder 20 may quantize, based on the final QP for the color component, a coefficient block for the CU, the coefficient block for the CU being based on sample values of the color component. Once each coefficient has been quantized, video encoder 20 may further output the encoded CU based on the quantized coefficient blocks for the CU in an encoded bitstream.

In another example, video decoder 30 may decode a CU of the video data. In decoding the video data, video decoder 30 may determine that the CU was encoded using a color space conversion. Video decoder 30 may determine an initial QP for the color component and determine a final QP for the color component based on the CU being encoded using the color space conversion, such that the final QP for the color component is equal to a sum of the initial QP of the color component and a non-zero QP offset for the color component. Video decoder 30 may inverse quantize, based on the final QP for the color component, a coefficient block for the CU, the coefficient block for the CU being based on sample values of the color component. Once each coefficient block has been inverse quantized, video decoder 30 may reconstruct the CU based on the inverse quantized coefficient blocks for the CU.

In some examples, for the color component of the one or more color components, the QP offset for the color component may be signaled in one of a PPS, a SPS, or a slice header. In some further examples, the plurality of color components may comprise three color components. In such examples, a first QP offset for a first quantization parameter for a first color component is equal to a second QP offset for a second QP for a second color component, the first QP offset (and the second quantization parameter offset) is less than a third QP offset for a third QP for a third color component.

Accordingly, in some examples, the CU is a first CU. In such examples, video encoder 20 may encode a second CU. In encoding the second CU, video encoder 20 may, determine a second QP for the color component, set a final QP value for the color component based on the second CU not being encoded using the color space conversion such that the second final QP value for the color component is equal to the second initial QP value of the color component, and quantize, based on the second final QP for the color component, a coefficient block of the second CU, the coefficient block of the second CU based on sample values of the color component. Video encoder 20 may further output the video data bitstream comprising a second set of one or more entropy encoded syntax elements representative of each of the quantized second coefficient blocks.

In decoding this example, video decoder 30 may decode a second CU. In decoding the second CU, video decoder 30 may, for a color component of the plurality of color components, determine a second QP for the color components, determine a second final QP value for the color component based on the second CU not being encoded using the color space conversion such that the second final QP value for the color component is equal to the second initial QP value of the color component, and inverse quantize, based on the final QP for the color component, a coefficient block of the second CU, the coefficient block of the second CU based on sample values of the color component. Video decoder 30 may reconstruct the second CU based on each of the one or more inverse quantized coefficient blocks of the second CU.

Instead of using one fixed set of delta QPs for all modes, the settings of delta QPs for the three color component may be mode-dependent. In one example, intra and Intra BC modes may share the same set of (deltaQP$_{C0}$, deltaQP$_{C1}$, deltaQP$_{C2}$) while inter modes may share another set of (deltaQP$_{C0}$, deltaQP$_{C1}$, deltaQP$_{C2}$) which is not identical to the one used by intra and Intra BC modes. In another example, intra modes may share the same set of (deltaQP$_{C0}$, deltaQP$_{C1}$, deltaQP$_{C2}$) while Intra BC mode and inter modes may share another set of (deltaQP$_{C0}$, deltaQP$_{C1}$, deltaQP$_{C2}$) which is not identical to the one used by intra modes. In some examples, the set of delta QPs (deltaQP$_{C0}$, deltaQP$_{C1}$, deltaQP$_{C2}$) could be (−4+6*BitInc, −4+6*BitInc, −3+6*BitInc), (−4+6*BitInc, −4+6*BitInc, −2+6*BitInc), (−5+6*BitInc, −5+6*BitInc, −3+6*BitInc) or (−5+6*BitInc, −5+6*BitInc, −2+6*BitInc) wherein BitInc may be 0, 1, 2.

In other words, in some examples, the plurality of color components comprises three color components. In such examples, the quantization parameter offsets may be equal to (−5+6*BitInc, −5+6*BitInc, −3+6*BitInc). In other such examples, the quantization parameter offsets may be equal to other values, such as (−4+6*BitInc, −4+6*BitInc, −3+6*BitInc), (−4+6*BitInc, −4+6*BitInc, −2+6*BitInc), or (−5+6*BitInc, −5+6*BitInc, −2+6*BitInc). In any case, BitInc may be equal to 0, 1, or 2.

An I-slice is a slice that may contain only intra coded blocks or Intra BC coded blocks. A P-slice is a slice that may contain only intra coded and uni-directionally inter predicted blocks. A B-slice is a slice that may contain intra predicted blocks, uni-directionally inter predicted blocks, and bi-directionally inter predicted blocks. In some examples, instead of using one fixed set of delta QPs for all modes, the settings of delta QPs for the three color component may be dependent on the slice types. In one example, the I-slices may share the same set while P/B-slices share the same set. In another example, different sets may be applied to I/P/B slices. Furthermore, in some examples, the set of delta QPs may be signaled in an SPS, a PPS, or a slice header.

In other words, in some examples, the QP offset for the color component may be dependent on whether a slice type of the CU an I-slice type, a P-slice type, or a B-slice type. In such examples, for the color component, video encoder 20 may determine that the QP offset for the color component is equal to a first value when the slice type of the CU is the I-slice type and equal to a second value when the slice type of the CU is the P-slice type or the B-slice type, the first value being different from the second value. In other such examples, for the color component, video encoder 20 may determine that the QP offset for the color component is equal to a first value when the slice type of the CU is the I-slice type, equal to a second value when the slice type of the CU is the P-slice type, and equal to a third value when the slice type of the CU is the B-slice type, the first value being different from the second value, the second value being different from the third value, and the first value being different from the third value.

In other examples, the QP offset for the color component may be dependent on whether a slice type of the CU an I-slice type, a P-slice type, or a B-slice type. In such examples, for the color component, video decoder 30 may determine that the QP offset for the color component is equal to a first value when the slice type of the CU is the I-slice type and equal to a second value when the slice type of the CU is the P-slice type or the B-slice type, the first value being different from the second value. In other such examples, for the color component, video decoder 30 may determine that the QP offset for the color component is equal to a first value when the slice type of the CU is the I-slice type, equal to a second value when the slice type of the CU is the P-slice type, and equal to a third value when the slice type of the CU is the B-slice type, the first value being different from the second value, the second value being different from the third value, and the first value being different from the third value.

In some examples, when the data dynamic range is increased due to the color transform, a video coder may clip the transformed residual into the same range as those residuals before color transform. For example, if the input data is in N-bit precision, the residual after intra/inter prediction may be in the range of $[-2^N, 2^N-1]$ (or more precisely, in the range of $[-2^N-1, 2^N-1]$). After applying the color transform, the transformed residual may also be clipped to the same range. In some examples, when the coded block flag of three color components are all equal to 0, the inverse color transform may be skipped.

In some examples, when the color transform is applied, the derived $Qp_Y$ with the conventional way may be further modified to $(Qp_Y+deltaQP_{CO})$. Therefore, in the deblocking filter process, the boundary strength of luma/chroma edges may be firstly determined which are dependent on the modified $Qp_Y$. Alternatively, the unmodified $Qp_Y$ may be used in the boundary strength of luma/chroma edges of deblocking filter process.

In other words, in some examples, the plurality of color components comprises a luma component and a chroma component. In such examples, video encoder 20 may further determine, based at least in part on the final QP for the luma component, a boundary strength of a luma edge. Video encoder 20 may further determine, based at least in part on the final QP for the chroma component, a boundary strength of a chroma edge. In response to determining that the boundary strength of the luma edge does not meet a first threshold, video encoder 20 may perform a deblocking filtering process on the luma edge. Further, in response to determining that the boundary strength of the chroma edge does not meet a second threshold, video encoder 20 may perform the deblocking filtering process on the chroma edge.

In other examples, the plurality of color components comprises a luma component and a chroma component. In such examples, video decoder 30 may further determine, based at least in part on the final QP for the luma component, a boundary strength of a luma edge. Video decoder 30 may further determine, based at least in part on the final QP for the chroma component, a boundary strength of a chroma edge. In response to determining that the boundary strength of the luma edge does not meet a first threshold, video decoder 30 may perform a deblocking filtering process on the luma edge. Further, in response to determining that the boundary strength of the chroma edge does not meet a second threshold, video decoder 30 may perform the deblocking filtering process on the chroma edge.

In some examples, a constraint may be added in the specification that when color transform is enabled for one CU and the CU is coded with intra mode, all the PUs within the CU shall use the direct mode (DM). When a PU is encoded using direct mode, video encoder 20 does not signal motion information syntax elements, but may signal syntax elements representing residual data. In other words, the chroma prediction mode may be the same as the luma prediction mode. Alternatively, furthermore, when color transform is enabled for one CU, pcm_flag shall be equal to 0.

In other words, in some examples, input data of the color space conversion has N-bit precision. In such examples, residual data for the CU after intra/inter prediction may be in a range of $[-2^N, 2^N-1]$. In some other examples, in response to determining that the CU is coded with an intra coding mode, video encoder 20 may further predict all chroma blocks of the CU using a same chroma prediction mode. In such examples, video encoder 20 may further predict all luma blocks of the CU using a same luma prediction mode. The same luma prediction mode may be the same as the same chroma prediction mode. In another example, one CU may contain four luma blocks. In such examples, each luma block may be coded with its own luma prediction mode, and the luma prediction mode of the top-left luma block within the CU may be the same as the same chroma prediction mode.

In other examples, input data of the color space conversion has N-bit precision. In such examples, residual data for the CU after intra/inter prediction may be in a range of $[-2^N, 2^N-1]$. In some other examples, in response to determining that the CU is coded with an intra coding mode, video decoder 30 may further predict all chroma blocks of the CU using a same chroma prediction mode. In such examples, video decoder 30 may further predict all luma blocks of the CU using a same luma prediction mode. The same luma prediction mode may be the same as the same chroma prediction mode. In another example, one CU may contain four luma blocks. In such examples, each luma block may be coded with its own luma prediction mode, and the luma prediction mode of the top-left luma block within the CU may be the same as the same chroma prediction mode.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the GOP, and the frame syntax data may indicate an encoding/prediction mode used to encode the corresponding frame.

Figure 6:
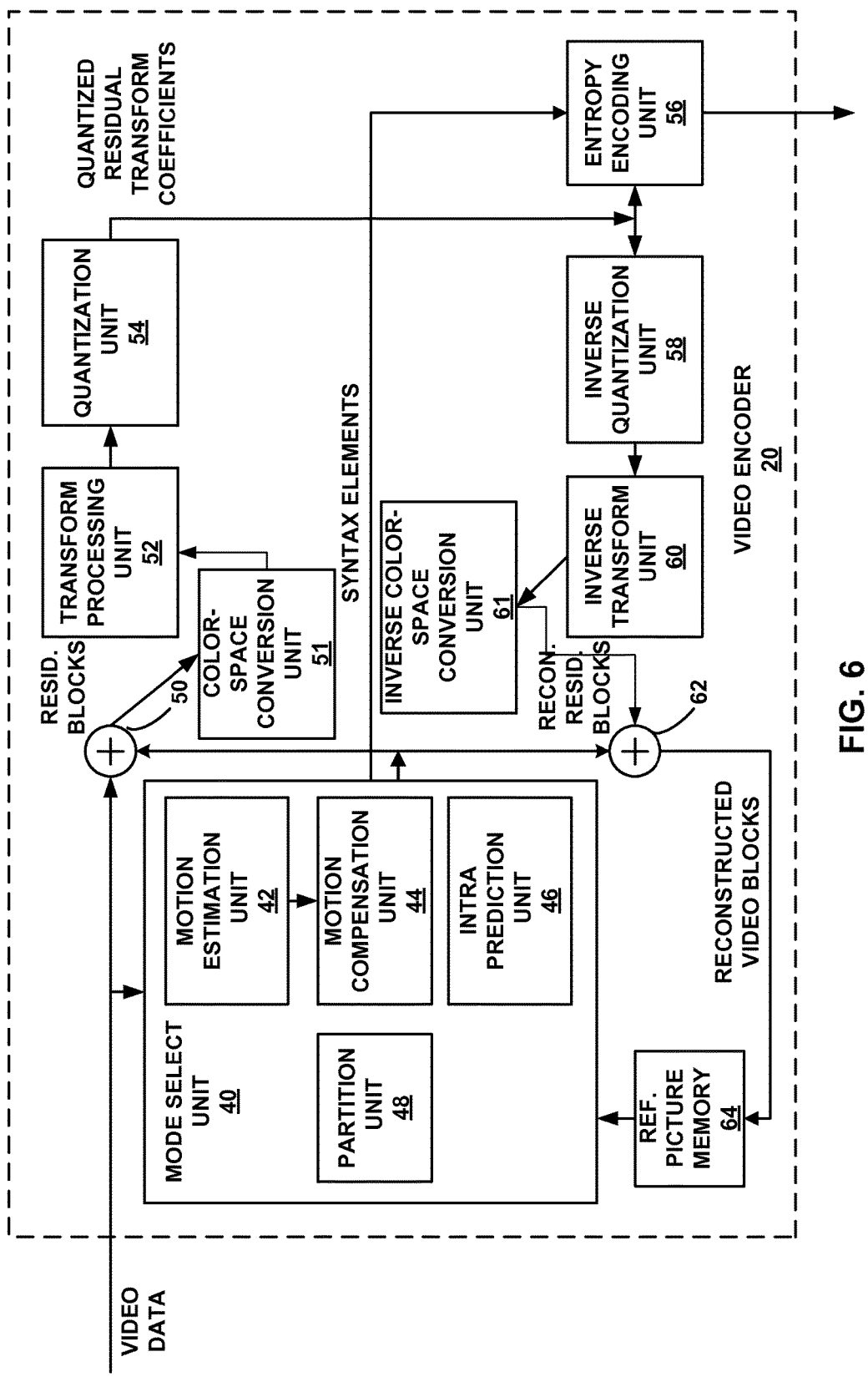
FIG. 6 is block diagram illustrating an example video encoder that may implement the techniques described in this disclosure.

FIG. 6 is a block diagram illustrating an example of video encoder 20 that may implement techniques for encoding video blocks using a color-space conversion process. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 6, video encoder 20 receives a current video block within a video frame to be encoded. In the example of FIG. 6, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. Mode select unit 40 may also include other units based on the selected mode, such as an Intra BC mode module. For video block reconstruction, video encoder 20 also includes inverse quantization unit 58, inverse transform unit 60, and summer 62. A deblocking filter (not shown in FIG. 6) may also be included to filter block boundaries to remove blockiness artifacts from reconstructed video. In typical examples, summer 62 receives the output of the deblocking filter. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be encoded. The frame or slice may be divided into multiple video blocks. Motion estimation unit 42 and motion compensation unit 44 perform inter-predictive coding of a video block based on one or more blocks in one or more reference frames to provide temporal prediction. Video encoder 20 may perform multiple coding passes, e.g., to select an appropriate coding mode for each block of video data.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 may form a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Intra-prediction unit 46 may perform intra-predictive coding of the video block based on one or more neighboring blocks in the same frame or slice as the block to be coded to provide spatial prediction. Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and may provide the resulting intra- or inter-coded block to summer 50 to generate residual block data and to summer 62 to reconstruct the encoded block for use as a reference frame. Mode select unit 40 also provides syntax elements, such as intra-mode indicators, partition information, and other such syntax information, to entropy encoding unit 56.

Video encoder 20 may form a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

In accordance with techniques of this disclosure, entropy encoding unit 56 of video encoder 20 may perform one or more techniques of the current disclosure. For example, entropy encoding unit 56 of video encoder 20 may encode a CU of the video data. In encoding the video data, color-space conversion unit 51 may determine whether to encode the CU using a color space conversion. For a color component, quantization unit 54 may determine an initial QP for the color component and set a final QP for the color component based on the CU being encoded using the color space conversion such that the final QP for the color component is equal to a sum of the initial QP of the color component and a non-zero QP offset for the color component. Quantization unit 54 may quantize, based on the final QP for the color component, a coefficient block for the CU, the coefficient block for the CU being based on sample values of the color component. Once each coefficient has been quantized, entropy encoding unit 56 may further output a video data bitstream comprising one or more entropy encoded syntax elements representative of each of the quantized coefficient blocks.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 may perform one or more techniques of the current disclosure. For example, entropy encoding unit 56 of video encoder 20 may encode a coding unit (CU) of the video data. In encoding the video data, color-space conversion unit 51 of video encoder 20 may determine to encode the CU using a color space conversion. Quantization unit 54 of video encoder 20 may determine an initial quantization parameter (QP) for the color component and set a final QP for the color component based on the CU being encoded using the color space conversion such that the final QP for the color component is equal to a sum of the initial QP of the color component and a non-zero QP offset for the color component. Quantization unit 54 of video encoder 20 may quantize, based on the final QP for the color component, a coefficient block for the CU, the coefficient block for the CU being based on sample values of the color component. Once each coefficient has been quantized, quantization unit 54 of video encoder 20 may further output a video data bitstream comprising one or more entropy encoded syntax elements representative of each of the quantized coefficient blocks.

In some examples, the QP offset for the color component may be signaled in one of a PPS, a SPS, or a slice header. In some further examples, the plurality of color components may comprise three color components. In such examples, a first QP offset for a first QP for a first color component is equal to a second QP offset for a second QP a second color component, the first QP offset (and the second QP offset) is less than a third QP offset for a third QP for a third color component. In some examples, a deblocking filtering process may be further performed on the CU. In such examples, video encoder 20 may use the initial QP for each color component rather than the final QP.

In some examples, the plurality of color components comprises a luma component and a chroma component. In such examples, quantization unit 54 of video encoder 20 may further determine, based at least in part on the final QP for the luma component, a boundary strength of a luma edge. Quantization unit 54 of video encoder 20 may further determine, based at least in part on the final QP for the chroma component, a boundary strength of a chroma edge. In response to determining that the boundary strength of the luma edge does not meet a first threshold, quantization unit 54 of video encoder 20 may perform a deblocking filtering process on the luma edge. Further, in response to determining that the boundary strength of the chroma edge does not meet a second threshold, quantization unit 54 of video encoder 20 may perform the deblocking filtering process on the chroma edge.

In some further examples, the CU is a first CU. In such examples, entropy encoding unit 56 of video encoder 20 may encode a second CU. In encoding the second CU, quantization unit 54 of video encoder 20 may, for the color component, determine a QP for the color components, set a final QP value for the color component based on the second CU not being encoded using the color space conversion such that the final QP value for the color component is equal to the initial QP value of the color component, and quantize, based on the final QP for the color component, a coefficient block of the second CU, the coefficient block of the second CU based on sample values of the color component. Quantization unit 54 of video encoder 20 may further output the video data bitstream comprising a second set of one or more entropy encoded syntax elements representative of each of the quantized second coefficient blocks.

In some examples, for the color component, the QP offset for the color component is dependent on an encoding mode of the CU. In some such examples, for the color component, quantization unit 54 of video encoder 20 may determine the QP offset for the component such that the QP offset is equal to a first value when the encoding mode of the CU is an intra mode or an intra block copy (BC) mode, and equal to a second value when the encoding mode of the CU is an inter mode, the first value being different from the second value. In other such examples, for the color component, quantization unit 54 of video encoder 20 may determine the QP offset for the component such that the QP offset is equal to a first value when the encoding mode of the CU is an intra mode, and equal to a second value when the encoding mode of the CU is an intra block copy (BC) mode, the first value being different from the second value.

In some examples, the plurality of color components comprises three color components. In such examples, the quantization parameter offsets may be equal to (−5+6*BitInc, −5+6*BitInc, −3+6*BitInc). In other such examples, the quantization parameter offsets may be equal to other values, such as (−4+6*BitInc, −4+6*BitInc, −3+6*BitInc), (−4+6*BitInc, −4+6*BitInc, −2+6*BitInc), or (−5+6*BitInc, −5+6*BitInc, −2+6*BitInc). In any case, BitInc may be equal to 0, 1, or 2.

In some examples, for the color components of the plurality of color components, the QP offset for the color component may be dependent on whether a slice type of the CU an I-slice type, a P-slice type, or a B-slice type. In such examples, for the color component, quantization unit 54 of video encoder 20 may determine that the QP offset for the color component is equal to a first value when the slice type of the CU is the I-slice type and equal to a second value when the slice type of the CU is the P-slice type or the B-slice type, the first value being different from the second value. In other such examples, for the color component, quantization unit 54 of video encoder 20 may determine that the QP offset for the color component is equal to a first value when the slice type of the CU is the I-slice type, equal to a second value when the slice type of the CU is the P-slice type, and equal to a third value when the slice type of the CU is the B-slice type, the first value being different from the second value, the second value being different from the third value, and the first value being different from the third value.

In some examples, input data of the color space conversion has N-bit precision. In such examples, residual data for the CU after intra/inter prediction may be in a range of $[-2^N, 2^N-1]$. In some other examples, in response to determining that the CU is coded with an intra coding mode, quantization unit 54 of video encoder 20 may further predict all chroma blocks of the CU using a same chroma prediction mode. In such examples, intra prediction unit 46 of video encoder 20 may further predict all luma blocks of the CU using a same luma prediction mode. The same luma prediction mode may be the same as the same chroma prediction mode.

Figure 7:
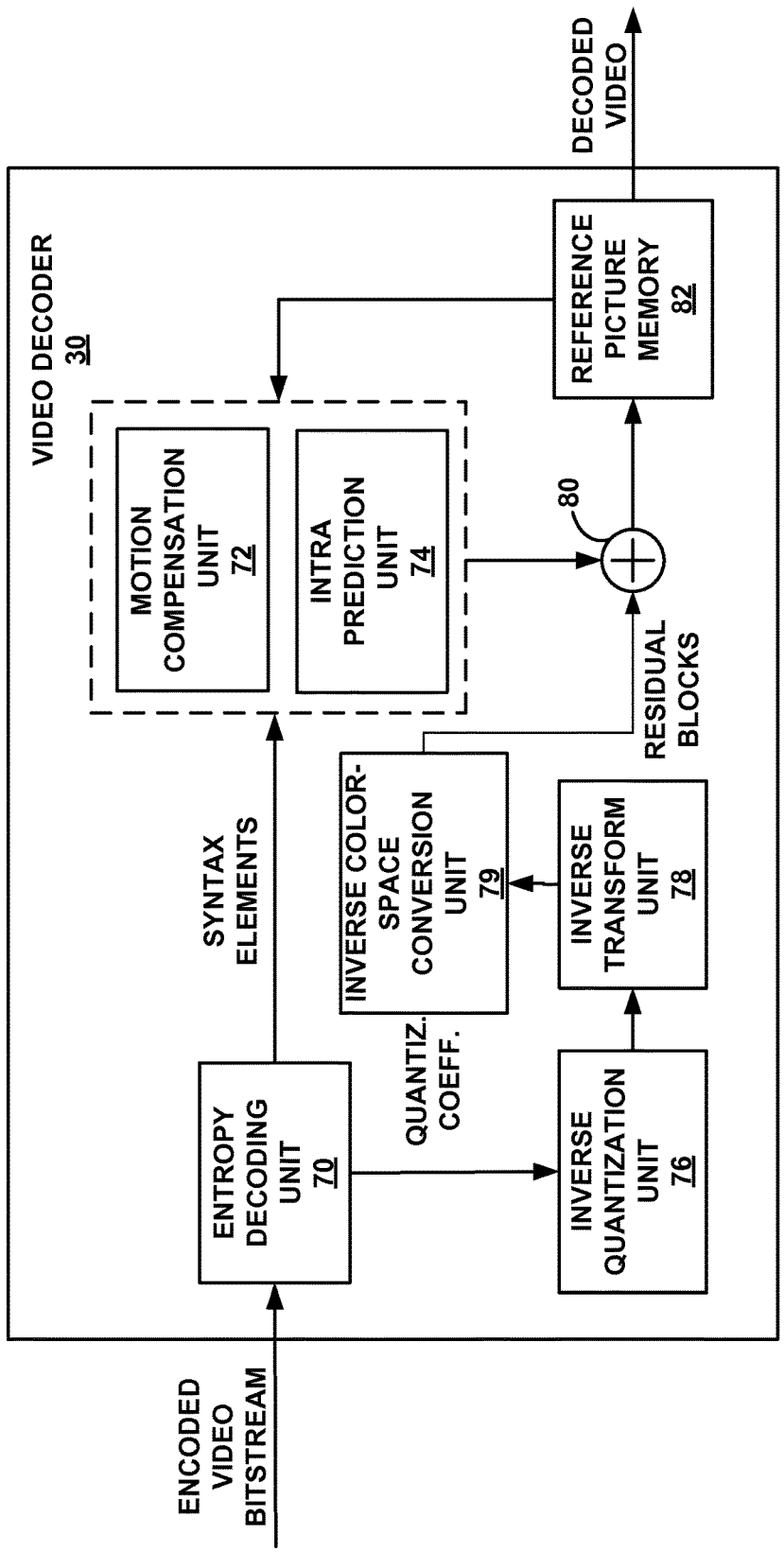
FIG. 7 is a block diagram illustrating an example video decoder that may implement the techniques described in this disclosure.

FIG. 7 is a block diagram illustrating an example of video decoder 30 that may implement techniques for decoding video blocks, some of which were encoded using a color-space conversion process. In the example of FIG. 7, video decoder 30 includes an entropy decoding unit 70, motion compensation unit 72, intra prediction unit 74, inverse quantization unit 76, inverse transformation unit 78, reference picture memory 82 and summer 80. Video decoder 30 may also include other units such as Intra BC unit. Video decoder 30 may, in some examples, perform a decoding pass generally reciprocal to the encoding pass described with respect to video encoder 20 (FIG. 6). Motion compensation unit 72 may generate prediction data based on motion vectors determined from syntax elements received from entropy decoding unit 70, while intra-prediction unit 74 may generate prediction data based on intra-prediction mode indicators received from entropy decoding unit 70. In some examples, intra-prediction unit 74 may infer some intra prediction mode indicators.

During the decoding process, video decoder 30 receives an encoded video bitstream that represents video blocks of an encoded video slice and associated syntax elements. Entropy decoding unit 70 of video decoder 30 entropy decodes the bitstream to generate quantized coefficients, motion vectors or intra-prediction mode indicators, and other syntax elements. Entropy decoding unit 70 forwards the syntax elements to motion compensation unit 72.

In accordance with techniques of this disclosure, video decoder 30 may perform one or more techniques of the current disclosure. For example, entropy decoding unit 70 of video decoder 30 may decode a coding unit (CU) of the video data. In decoding the video data, inverse color-space conversion unit 79 of video decoder 30 may determine that the CU was encoded using a color space conversion. For a color component, inverse quantization unit 76 of video decoder 30 may determine an initial quantization parameter (QP) for the color component and determine a final QP for the color component based on the CU being encoded using the color space conversion, such that the final QP for the color component is equal to a sum of the initial QP of the color component and a non-zero QP offset for the color component. Inverse quantization unit 76 of video decoder 30 may inverse quantize, based on the final QP for the color component, a coefficient block for the CU, the coefficient block for the CU being based on sample values of the color component. Once each coefficient block has been inverse quantized, summer 80 of video decoder 30 may reconstruct the coding unit based on the inverse quantized coefficient blocks for the CU.

Intra prediction unit 74 may use an intra prediction mode to generate a predictive block when the slice is an I slice, a P slice, or a B slice. In other words, you can have an intra predicted block in a slice that allows uni- or bi-directional inter prediction. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

In accordance with techniques of this disclosure, video decoder 30 may perform one or more techniques of the current disclosure. For example, video decoder 30 may decode a coding unit (CU) of the video data. In decoding the video data, inverse color-space conversion unit 79 of video decoder 30 may determine whether the CU was encoded using a color space conversion. For a color component, inverse quantization unit 76 of video decoder 30 may determine an initial QP for the color component and determine a final QP for the color component based on the CU being encoded using the color space conversion, such that the final QP for the color component is equal to a sum of the initial QP of the color component and a non-zero QP offset for the color component. Inverse quantization unit 76 of video decoder 30 may inverse quantize, based on the final QP for the color component, a coefficient block for the CU, the coefficient block for the CU being based on sample values of the color component. Once each coefficient block has been inverse quantized, summer 80 of video decoder 30 may reconstruct the coding unit based on the inverse quantized coefficient blocks for the CU.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates a predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 may perform one or more techniques of the current disclosure. For example, entropy decoding unit 70 of video decoder 30 may decode a CU of the video data. In decoding the video data, inverse color-space transform unit 79 of video decoder 30 may determine that the CU was encoded using a color space conversion. For a color component, inverse quantization unit 76 of video decoder 30 may determine an initial QP for the color component and determine a final QP for the color component based on the CU being encoded using the color space conversion, such that the final QP for the color component is equal to a sum of the initial QP of the color component and a non-zero QP offset for the color component. Inverse quantization unit 76 of video decoder 30 may inverse quantize, based on the final QP for the color component, a coefficient block for the CU, the coefficient block for the CU being based on sample values of the color component. Once each coefficient block has been inverse quantized, summer 80 of video decoder 30 may reconstruct the coding unit based on the inverse quantized coefficient blocks for the CU.

In some examples, for the color component of the one or more color components, the QP offset for the color component may be signaled in one of a picture parameter set, a sequence parameter set, or a slice header. In some further examples, the plurality of color components may comprise three color components. In such examples, a first quantization parameter offset for a first quantization parameter for a first color component is equal to a second quantization parameter offset for a second quantization parameter for a second color component, the first quantization parameter offset (and the second quantization parameter offset) is less than a third quantization parameter offset for a third quantization parameter for a third color component. In some examples, a deblocking filtering process may be further performed on the CU. In such examples, video decoder 30 may use the initial QP for each color component rather than the final QP.

In some examples, the plurality of color components comprises a luma component and a chroma component. In such examples, a deblocking unit (not pictured) of video decoder 30 may further determine, based at least in part on the final QP for the luma component, a boundary strength of a luma edge. The deblocking unit of video decoder 30 may further determine, based at least in part on the final QP for the chroma component, a boundary strength of a chroma edge. In response to determining that the boundary strength of the luma edge does not meet a first threshold, the deblocking unit of video decoder 30 may perform a deblocking filtering process on the luma edge. Further, in response to determining that the boundary strength of the chroma edge does not meet a second threshold, the deblocking unit of video decoder 30 may perform the deblocking filtering process on the chroma edge.

In some further examples, the CU is a first CU. In such examples, inverse quantization unit 76 of video decoder 30 may decode a second CU. In decoding the second CU, inverse quantization unit 76 of video decoder 30 may, for the color component, determine a QP for the color components, determine a final QP value for the color component based on the second CU not being encoded using the color space conversion such that the final QP value for the color component is equal to the initial QP value of the color component, and inverse quantize, based on the final QP for the color component, a coefficient block of the second CU, the coefficient block of the second CU based on sample values of the color component. Video decoder 30 may further reconstruct the second CU based on each of the one or more inverse quantized coefficient blocks of the second CU.

In some examples, for the color component, the QP offset for the color component is dependent on an encoding mode of the CU. In some such examples, for the color component, inverse quantization unit 76 of video decoder 30 may determine the QP offset for the component such that the QP offset is equal to a first value when the encoding mode of the CU is an intra mode or an intra BC mode, and equal to a second value when the encoding mode of the CU is an inter mode, the first value being different from the second value. In other such examples, for the color component, inverse quantization unit 76 of video decoder 30 may determine the QP offset for the component such that the QP offset is equal to a first value when the encoding mode of the CU is an intra mode, and equal to a second value when the encoding mode of the CU is an intra BC mode, the first value being different from the second value.

In some examples, the plurality of color components comprises three color components. In such examples, the quantization parameter offsets may be equal to (−5+6*BitInc, −5+6*BitInc, −3+6*BitInc). In other such examples, the quantization parameter offsets may be equal to other values, such as (−4+6*BitInc, −4+6*BitInc, −3+6*BitInc), (−4+6*BitInc, −4+6*BitInc, −2+6*BitInc), or (−5+6*BitInc, −5+6*BitInc, −2+6*BitInc). In any case, BitInc may be equal to 0, 1, or 2.

In some examples, for the color components of the plurality of color components, the QP offset for the color component may be dependent on whether a slice type of the CU an I-slice type, a P-slice type, or a B-slice type. In such examples, for the color component, inverse quantization unit 76 of video decoder 30 may determine that the QP offset for the color component is equal to a first value when the slice type of the CU is the I-slice type and equal to a second value when the slice type of the CU is the P-slice type or the B-slice type, the first value being different from the second value. In other such examples, for the color component, inverse quantization unit 76 may determine that the QP offset for the color component is equal to a first value when the slice type of the CU is the I-slice type, equal to a second value when the slice type of the CU is the P-slice type, and equal to a third value when the slice type of the CU is the B-slice type, the first value being different from the second value, the second value being different from the third value, and the first value being different from the third value.

In some examples, input data of the color space conversion has N-bit precision. In such examples, residual data for the CU after intra/inter prediction may be in a range of $[-2^N, 2^N-1]$. In some other examples, in response to determining that the CU is coded with an intra coding mode, intra prediction unit 74 of video decoder 30 may further predict all chroma blocks of the CU using a same chroma prediction mode. In such examples, intra prediction unit 74 may further predict all luma blocks of the CU using a same luma prediction mode. The same luma prediction mode may be the same as the same chroma prediction mode.

In some example implementations of the above techniques, requisite syntax elements may be found in the sequence parameter set. In the following tables, italicized text represents additions relative to the current draft of HEVC standards. Bold text denotes syntax elements. In some examples, a sequence parameter set RBSP may have the following syntax:

| seq_parameter_set_rbsp( ) { | Descriptor |
|---|---|
|   sps_video_parameter_set_id | u(4) |
|   sps_max_sub_layers_minus1 | u(3) |
|   sps_temporal_id_nesting_flag | u(1) |
|   profile_tier_level( sps_max_sub_layers_minus1 ) | |
| . . . | |
|   vui_parameters_present_flag | u(1) |
|   if( vui_parameters_present_flag ) | |
|     vui_parameters( ) | |
|   sps_extension_present_flag | u(1) |
|   if( sps_extension_present_flag ) { | |
|     for( i = 0; i < 1; i++ ) | |
|       sps_extension_flag[ i ] | u(1) |
|     sps_extension_7bits | u(7) |
|     if( sps_extension_flag[ 0 ] ) { | |
|       transform_skip_rotation_enabled_flag | u(1) |
|       transform_skip_context_enabled_flag | u(1) |
|       intra_block_copy_enabled_flag | u(1) |
|       implicit_rdpcm_enabled_flag | u(1) |
|       explicit_rdpcm_enabled_flag | u(1) |
|       extended_precision_processing_flag | u(1) |
|       intra_smoothing_disabled_flag | u(1) |
|       high_precision_offsets_enabled_flag | u(1) |
|       fast_rice_adaptation_enabled_flag | u(1) |
|       cabac_bypass_alignment_enabled_flag | u(1) |
|       *__color_transform_enabled_flag__* | u(1) |
|       *__lossless_enable_flag__* | u(1) |
|     } | |
|     if( sps_extension_7bits ) | |
|       while( more_rbsp_data( ) ) | |
|         sps_extension_data_flag | u(1) |
|   } | |
|   rbsp_trailing_bits( ) | |
| } | |

In this example, color_transform_enabled_flag equal to 1 indicates that color transform is enabled. When the syntax element color_transform_enabled_flag is equal to 0, color transform is not enabled. When the syntax element lossless_enable_flag is equal to 1, lossless coding is applied. In addition, when color_transform_enabled_flag is equal to 1, the original YCoCg-R transform is used. When the syntax element lossless_enable_flag is equal to 0, lossy coding is applied. In addition, when color_transform_enabled_flag is equal to 1, the original YCoCg transform is used.

Alternatively, the newly introduced flags may be signaled only when chroma_format_idc is equal to 3.

| seq_parameter_set_rbsp( ) { | Descriptor |
|---|---|
|    sps_video_parameter_set_id | u(4) |
|    sps_max_sub_layers_minus1 | u(3) |
|    sps_temporal_id_nesting_flag | u(1) |
|    profile_tier_level( sps_max_sub_layers_minus1 ) | |
|    ... | |
|    vui_parameters_present_flag | u(1) |
|    if( vui_parameters_present_flag ) | |
|      vui_parameters( ) | |
|    sps_extension_present_flag | u(1) |
|    if( sps_extension_present_flag ) { | |
|      for( i = 0; i < 1; i++ ) | |
|        sps_extension_flag[ i ] | u(1) |
|      sps_extension_7bits | u(7) |
|      if( sps_extension_flag[ 0 ] ) { | |
|        transform_skip_rotation_enabled_flag | u(1) |
|        transform_skip_context_enabled_flag | u(1) |
|        intra_block_copy_enabled_flag | u(1) |
|        implicit_rdpcm_enabled_flag | u(1) |
|        explicit_rdpcm_enabled_flag | u(1) |
|        extended_precision_processing_flag | u(1) |
|        intra_smoothing_disabled_flag | u(1) |
|        high_precision_offsets_enabled_flag | u(1) |
|        fast_rice_adaptation_enabled_flag | u(1) |
|        cabac_bypass_alignment_enabled_flag | u(1) |
|        if( *chroma_format_idc* == 3 ) { | |
|          *color_transform_enabled_flag* | u(1) |
|          *lossless_enable_flag* | u(1) |
|        } | |
|      } | |
|      if( sps_extension_7bits ) | |
|        while( more_rbsp_data( ) ) | |
|          sps_extension_data_flag | u(1) |
|    } | |
|    rbsp_trailing_bits( ) | |
| } | |

Alternatively, the newly introduced flags may be signaled only when chroma_format_idc is equal to 3 and the three colour components of the 4:4:4 chroma format are not coded separately. Therefore, the above condition 'if(chroma_format_idc==3)' may be replaced by 'if(chroma_format_idc==3 && !separate_colour_plane_flag)'.

Further, a constraint may be applied that when color_transform_enabled_flag is equal to 1, chroma_format_idc may be equal to 3. Alternatively, furthermore, when color_transform_enabled_flag is equal to 1, separate_colour_plane_flag may be equal to 0.

In some examples, a coding unit may have the following syntax:

| coding_unit( x0, y0, log2CbSize ) { | Descriptor |
|---|---|
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( CuPredMode[ x0 ][ y0 ] != MODE_INTRA \|\| | |
|       log2CbSize == MinCbLog2SizeY ) | |
|     part_mode | ae(v) |
|     if( CuPredMode[ x0 ][ y0 ] == MODE_INTRA ) { | |
|       if( PartMode == PART_2Nx2N && pcm_enabled_flag && | |
|         log2CbSize >= Log2MinIpcmCbSizeY && | |
|         log2CbSize <= Log2MaxIpcmCbSizeY ) | |
|       pcm_flag[ x0 ][ y0 ] | ae(v) |
|       if( pcm_flag[ x0 ][ y0 ] ) { | |
|         while( !byte_aligned( ) ) | |
|           pcm_alignment_zero_bit | f(1) |
|         pcm_sample( x0, y0, log2CbSize ) | |
|       } else { | |
|         if( *color_transform_enabled_flag* ) { | |
|           *color_transform_flag* [ *x0* ][ *y0* ] | ae(v) |
|         } | |
|         pbOffset = ( PartMode == PART_NxN ) ? ( nCbS / 2 ) : nCbS | |
|         for( j = 0; j < nCbS; j = j + pbOffset ) | |
|           for( i = 0; i < nCbS; i = i + pbOffset ) | |
|             prev_intra_luma_pred_flag[ x0 + i ][ y0 + j ] | ae(v) |
|         for( j = 0; j < nCbS; j = j + pbOffset ) | |
|           for( i =0; i < nCbS; i = i + pbOffset ) | |
|             if( prev_intra_luma_pred_flag[ x0 + i ][ y0 + j ] ) | |
|               mpm_idx[ x0 + i ][ y0 + j ] | ae(v) |
|             else | |
|               rem_intra_luma_pred_mode[ x0 + i ][ y0 + j ] | ae(v) |
|         if( ChromaArrayType == 3 && ! *color_transform_flag* [ *x0* ][ *y0* ]) | |
|           for( j = 0; j < nCbS; j = j + pbOffset ) | |
|             for( i = 0; i < nCbS; i = i + pbOffset ) | |
|               intra_chroma_pred_mode[ x0 + i ][ y0 + j ] | ae(v) |
|         else if( ChromaArrayType != 0 ) | |

| coding_unit( x0, y0, log2CbSize ) { | Descriptor |
|---|---|
|    intra_chroma_pred_mode[ x0 ][ y0 ] | ae(v) |
|   } | |
|  } else { | |
| ... | |
|   } | |
|  } | |
|  if( !pcm_flag[ x0 ][ y0 ] ) { | |
|   if( CuPredMode[ x0 ][ y0 ] != MODE_INTRA && | |
|    !( PartMode == PART_2Nx2N && merge_flag[ x0 ][ y0 ] ) ) | |
|    rqt_root_cbf | ae(v) |
|   if( rqt_root_cbf ) { | |
|    if( color_transform_enabled_flag && CuPredMode[ x0 ][ y0 ] != MODE_INTRA ) { | |
|     *color_transform_flag[ x0 ][ y0 ]* | ae(v) |
|    } | |
|    MaxTrafoDepth = ( CuPredMode[ x0 ][ y0 ] == MODE_INTRA ? | |
|     ( max_transform_hierarchy_depth_intra + IntraSplitFlag ) : | |
|     max_transform_hierarchy_depth_inter ) | |
|    transform_tree( x0, y0, x0, y0, log2CbSize, 0, 0 ) | |
|   } | |
|  } | |
| } | |

In the above example, for intra mode, the color transform flag is firstly signaled. When this flag is equal to 1, the signaling of intra_chroma_pred_mode may be skipped, wherein the chroma components share the same mode as luma.

Alternatively, in some examples, the coding unit may have the following syntax:

| coding_unit( x0, y0, log2CbSize ) { | Descriptor |
|---|---|
|  if( transquant_bypass_enabled_flag ) | |
|   cu_transquant_bypass_flag | ae(v) |
|  if( slice_type != I ) | |
|   cu_skip_flag[ x0 ][ y0 ] | ae(v) |
|  nCbS = ( 1 << log2CbSize ) | |
|  if( cu_skip_flag[ x0 ][ y0 ] ) | |
|   prediction_unit( x0, y0, nCbS, nCbS ) | |
|  else { | |
|   if( slice_type != I ) | |
|    pred_mode_flag | ae(v) |
|   if( CuPredMode[ x0 ][ y0 ] != MODE_INTRA \|\| | |
|    log2CbSize == MinCbLog2SizeY ) | |
|    part_mode | ae(v) |
|   if( CuPredMode[ x0 ][ y0 ] == MODE_INTRA ) { | |
|    if( PartMode == PART_2Nx2N && pcm_enabled_flag && | |
|     log2CbSize >= Log2MinIpcmCbSizeY && | |
|     log2CbSize <= Log2MaxIpcmCbSizeY ) | |
|    pcm_flag[ x0 ][ y0 ] | ae(v) |
|    if( pcm_flag[ x0 ][ y0 ] ) { | |
|     while( !byte_aligned( ) ) | |
|      pcm_alignment_zero_bit | f(1) |
|     pcm_sample( x0, y0, log2CbSize ) | |
|    } else { | |
|     pbOffset = ( PartMode == PART_NxN ) ? ( nCbS / 2 ) : nCbS | |
|     for( j = 0; j < nCbS; j = j + pbOffset ) | |
|      for( i = 0; i < nCbS; i = i + pbOffset ) | |
|       prev_intra_luma_pred_flag[ x0 + i ][ y0 + j ] | ae(v) |
|     for( j = 0; j < nCbS; j = j + pbOffset ) | |
|      for( i = 0; i < nCbS; i = i + pbOffset ) | |
|       if( prev_intra_luma_pred_flag[ x0 + i ][ y0 + j ] ) | |
|        mpm_idx[ x0 + i ][ y0 + j ] | ae(v) |
|       else | |
|        rem_intra_luma_pred_mode[ x0 + i ][ y0 + j ] | ae(v) |
|     if( ChromaArrayType == 3 ) | |
|      for( j = 0; j < nCbS; j = j + pbOffset ) | |
|       for( i =0; i < nCbS; i = i + pbOffset ) | |
|        intra_chroma_pred_mode[ x0 + i ][ y0 + j ] | ae(v) |
|     else if( ChromaArrayType != 0 ) | |

-continued

| coding_unit( x0, y0, log2CbSize ) { | Descriptor |
|---|---|
|       intra_chroma_pred_mode[ x0 ][ y0 ] | ae(v) |
|     } | |
|   } else { | |
| ... | |
|     } | |
|   } | |
|   if( !pcm_flag[ x0 ][ y0 ] ) { | |
|     if( CuPredMode[ x0 ][ y0 ] != MODE_INTRA &&<br>      !( PartMode == PART_2Nx2N && merge_flag[ x0 ][ y0 ] ) ) | |
|       rqt_root_cbf | ae(v) |
|     if( rqt_root_cbf ) { | |
|       if( *color_transform_enabled_flag*<br>&&(*CuPredMode*[ *x0* ][ *y0* ] == *MODE_INTER*<br>  \|\| !*intra_chroma_pred_mode*[ *x0* ][ *y0* ]) { | |
|         color_transform_flag [ *x0* ][ *y0* ] | ae(v) |
|       } | |
|       MaxTrafoDepth = ( CuPredMode[ x0 ][ y0 ] == MODE_INTRA ?<br>        ( max_transform_hierarchy_depth_intra +<br>IntraSplitFlag ) :<br>        max_transform_hierarchy_depth_inter )<br>      transform_tree( x0, y0, x0, y0, log2CbSize, 0, 0 ) | |
|     } | |
|   } | |
| } | |

Alternatively, when intra BC mode is considered as an intra mode, that is, the corresponding CuPredMode[x0][y0] is equal to MODE_INTRA, the above highlighted condition 'if(color_transform_enabled_flag &&(CuPredMode[x0][y0]==MODE_INTER||!intra_chroma_pred_mode[x0][y0])' could be replaced by 'if(color_transform_enabled_flag &&(CuPredMode[x0][y0]==MODE_INTER-||intra_bc_flag[x0][y0]||!intra_chroma_pred_mode[x0][y0])'. Alternatively, in all examples above, CuPredMode[x0][y0]==MODE_INTER may be replaced by CuPredMode[x0][y0]!=MODE_INTRA.

Alternatively, the above conditions 'if(color_transform_enabled_flag &&(CuPredMode[x0][y0]==MODE_INTER||!intra_chroma_pred_mode[x0][y0])' could be simply replaced by 'if(color_transform_enabled_flag)'. In this case, the constraint that chroma and luma modes are the same when color_transform_enabled_flag is equal to 1 and current CU is intra coded may be satisfied.

The following changes may be invoked when the current CU/PU/TU is not lossless coded (i.e., when cu_transquant_bypass_flag is equal to 0). In one example, the QP used in the de-quantization process may change when color transform is applied. However, the $Qp_Y$ used in the deblocking process may be unchanged, i.e., without the delta QP (delta$QP_{C0}$) taken into consideration.

In the decoding process, for the derivation process for quantization parameters, input to this process is a luma location ($x_{Cb}$, $y_{Cb}$) specifying the top-left sample of the current luma coding block relative to the top-left luma sample of the current picture. In this process, the variable $Qp_Y$, the luma quantization parameter $Qp'_Y$, and the chroma quantization parameters $Qp'_{Cb}$ and $Qp'_{Cr}$ are derived.

The luma location ($x_{Qg}$, $y_{Qg}$), specifies the top-left luma sample of the current quantization group relative to the top left luma sample of the current picture. The horizontal and vertical positions $x_{Qg}$ and $y_{Qg}$ are set equal to $x_{Cb}-(x_{Cb}$ & ((1<<Log 2 MinCuQpDeltaSize)-1)) and $y_{Cb}-(y_{Cb}$ & ((1<<Log 2 MinCuQpDeltaSize)-1)), respectively. The luma size of a quantization group, Log 2 MinCuQpDelta-Size, determines the luma size of the smallest area inside a coding tree block that shares the same $qP_{Y\_PRED}$.

The predicted luma quantization parameter $qP_{Y\_PRED}$ may be derived by the following ordered steps: 1) The variable $qP_{Y\_PREV}$ may be derived. If one or more of the following conditions are true, $qP_{Y\_PREV}$ is set equal to $SliceQp_Y$: The current quantization group is the first quantization group in a slice, the current quantization group is the first quantization group in a tile, or the current quantization group is the first quantization group in a coding tree block row and entropy_coding_sync_enabled_flag is equal to 1. Otherwise, $qP_{Y\_PREV}$ is set equal to the luma quantization parameter $Qp_Y$ of the last coding unit in the previous quantization group in decoding order.

2) The availability derivation process for a block in z-scan order is invoked with the location ($x_{Curr}$, $y_{Curr}$) set equal to ($x_{Cb}$, $y_{Cb}$) and the neighboring location ($x_{NbY}$, $y_{NbY}$) set equal to ($x_{Qg}-1$, $y_{Qg}$) as inputs, and the output is assigned to availableA. The variable $qP_{Y\_A}$ is derived as follows: If one or more of the following conditions are true, $qP_{Y\_A}$ is set equal to $qP_{Y\_PREV}$: availableA is equal to FALSE or the coding tree block address ctbAddrA of the coding tree block containing the luma coding block covering the luma location ($x_{Qg}-1$, $y_{Qg}$) is not equal to CtbAddrInTs, where ctbAddrA is derived as follows:

xTmp=($x_{Qg}$-1)>>Log 2 MinTrafoSize yTmp=$y_{Qg}$>>Log 2 MinTrafoSize minTbAddrA=MinTbAddrZs[xTmp][yTmp]

ctbAddrA=(minTbAddrA>>2)*(CtbLog 2 SizeY−
   Log 2 MinTrafoSize)

Otherwise, $qP_{Y\_A}$ is set equal to the luma quantization parameter $Qp_Y$ of the coding unit containing the luma coding block covering ($x_{Qg}-1$, $y_{Qg}$).

3) The availability derivation process for a block in z-scan order is invoked with the location ($x_{Curr}$, $y_{Curr}$) set equal to ($x_{Cb}$, $y_{Cb}$) and the neighboring location ($x_{NbY}$, $y_{NbY}$) set equal to ($x_{Qg}$, $y_{Qg}-1$) as inputs. The output is assigned to availableB. The variable $qP_{Y\_B}$ is derived. If one or more of the following conditions are true, $qP_{Y\_B}$ is set equal to $qP_{Y\_PREV}$: availableB is equal to FALSE or the coding tree block address ctbAddrB of the coding tree block containing the luma coding block covering the luma location ($x_{Qg}$, $y_{Qg}$−1) is not equal to CtbAddrInTs, where ctbAddrB is derived as follows:

xTmp=$x_{Qg}$>>Log 2 MinTrafoSize yTmp=($y_{Qg}$−1)>>Log 2 MinTrafoSize minTbAddrB=MinTbAddrZs[xTmp][yTmp]

ctbAddrB=(minTbAddrB>>2)*(CtbLog 2 SizeY−Log 2 MinTrafoSize)

Otherwise, qPY_B is set equal to the luma quantization parameter QpY of the coding unit containing the luma coding block covering (xQg, yQg−1).

The predicted luma quantization parameter $qP_{Y\_PRED}$ may be derived as follows:

$qP_{Y\_PRED}$=($qP_{Y\_A}$+$qP_{Y\_B}$+1)>>1

The variable $Qp_Y$ may be derived as follows:

$Qp_Y$=(($qP_{Y\_PRED}$+CuQpDeltaVal+52+2*QpbdOffset$_Y$) %(52+QpBdOffset$_Y$))−QpbdOffset$_Y$ The luma quantization parameter $Qp'_Y$ may be derived as follows:

$Qp'_Y$=$Qp_Y$+QpBdOffset$_Y$

When ChromaArrayType is not equal to 0, the variables $qPi_{Cb}$ and $qPi_{Cr}$ are derived as follows:

$qPi_{Cb}$=Clip3(−QpBdOffset$_C$,57,$Qp_Y$+pps_cb_qp_offset+slice_cb_qp_offset+CuQpOffset$_{Cb}$)

$qPi_{Cr}$=Clip3(−QpBdOffsetC,57,$Qp_Y$+pps_cr_qp_offset+slice_cr_qp_offset+CuQpOffset$_{Cr}$)

If ChromaArrayType is equal to 1, the variables $qP_{Cb}$ and $qP_{Cr}$ are set equal to the value of $Qp_C$ based on the index qPi equal to $qPi_{Cb}$ and $qPi_{Cr}$, respectively. Otherwise, the variables $qP_{Cb}$ and $qP_{Cr}$ are set equal to Min(qPi, 51), based on the index qPi equal to $qPi_{Cb}$ and $qPi_{Cr}$, respectively.

The chroma quantization parameters for the Cb and Cr components, $Qp'_{Cb}$ and $Qp'_{Cr}$, are derived as follows:

$Qp'_{Cb}$=$qP_{Cb}$+QpBdOffset$_C$ $Qp'_{Cr}$=$qP_{Cr}$+QpBdOffset$_C$

The specification of $Qp_c$ as a function of qPi for ChromaArrayType equal to 1 is as follows:

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_c$ | =qPi | 29 | 30 | 31 | 32 | 33 | 33 | 34 | 34 | 35 | 35 | 36 | 36 | 37 | 37 | =qPi − 6 |

In the de-quantization process, the quantization parameter qP for each component index (cIdx) may be derived. Inputs to this process may be a luma location (xTbY, yTbY) specifying the top-left sample of the current luma transform block relative to the top left luma sample of the current picture, a variable trafoDepth specifying the hierarchy depth of the current block relative to the coding block, a variable cIdx specifying the colour component of the current block, and a variable nTbS specifying the size of the current transform block. The output of this process may be the (nTbS)×(nTbS) array of residual samples r with elements r[x][y].

The quantization parameter qP may be derived. If cIdx is equal to 0, qP=$Qp'_Y$+(color_transform_flag[xTb$_Y$][yTb$_Y$]?deltaQP$_{C0}$:0)

Otherwise, if cIdx is equal to 1, qP=$Qp'_{Cb}$+(color_transform_flag[xTb$_Y$][yTb$_Y$]?deltaQP$_{C1}$:0)

Otherwise (cIdx is equal to 2), qP=$Qp'_{Cr}$+(color_transform_flag[xTb$_Y$][yTb$_Y$]?deltaQP$_{C2}$:0)

In one example, deltaQP$_{C0}$, deltaQP$_{C1}$ and deltaQP$_{C2}$ may be set to −5, −5 and −3, respectively. In another example, the $Qp_Y$ used in the deblocking process is unchanged, i.e., with the delta QP (deltaQP$_{C0}$) taken into consideration. In the decoding process, for the derivation process for quantization parameters, input to this process may be a luma location ($x_{Cb}$, $y_{Cb}$) specifying the top-left sample of the current luma coding block relative to the top-left luma sample of the current picture. In this process, the variable $Qp_Y$, the luma quantization parameter $Qp'_Y$, and the chroma quantization parameters $Qp'_{Cb}$ and $Qp'_{Cr}$ may be derived.

The luma location (xQg, yQg), specifies the top-left luma sample of the current quantization group relative to the top left luma sample of the current picture. The horizontal and vertical positions xQg and yQg are set equal to xCb−(xCb & ((1<<Log 2 MinCuQpDeltaSize)−1)) and yCb−(yCb & ((1<<Log 2 MinCuQpDeltaSize)−1)), respectively. The luma size of a quantization group, Log 2 MinCuQpDeltaSize, determines the luma size of the smallest area inside a coding tree block that shares the same $qP_{Y\_PRED}$.

The predicted luma quantization parameter $qP_{Y\_PRED}$ may be derived by the following ordered steps: 1) The variable $qP_{Y\_PREV}$ may be derived. If one or more of the following conditions are true, $qP_{Y\_PREV}$ is set equal to SliceQpy: The current quantization group is the first quantization group in a slice, the current quantization group is the first quantization group in a tile, or the current quantization group is the first quantization group in a coding tree block row and entropy_coding_sync_enabled_flag is equal to 1. Otherwise, $qP_{Y\_PREV}$ is set equal to the luma quantization parameter $Qp_Y$ of the last coding unit in the previous quantization group in decoding order.

2) The availability derivation process for a block in z-scan order is invoked with the location (xCurr, yCurr) set equal to (xCb, yCb) and the neighboring location (xNbY, yNbY) set equal to (xQg−1, yQg) as inputs, and the output is assigned to availableA. The variable $qP_{Y\_A}$ is derived as follows: If one or more of the following conditions are true, $qP_{Y\_A}$ is set equal to $qP_{Y\_PREV}$: availableA is equal to FALSE or the coding tree block address ctbAddrA of the coding tree block containing the luma coding block covering the luma location (xQg−1, yQg) is not equal to CtbAddrInTs, where ctbAddrA is derived as follows:

xTmp=(xQg−1)>>Log 2 MinTrafoSize yTmp=yQg>>Log 2 MinTrafoSize minTbAddrA=MinTbAddrZs[xTmp][yTmp]

ctbAddrA=(minTbAddrA>>2)*(CtbLog 2 Size$_Y$–Log 2 MinTrafoSize)

Otherwise, qP$_{Y\_A}$ is set equal to the luma quantization parameter Qp$_Y$ of the coding unit containing the luma coding block covering (xQg−1, yQg).

3) The availability derivation process for a block in z-scan order is invoked with the location (xCurr, yCurr) set equal to (xCb, yCb) and the neighboring location (xNbY, yNbY) set equal to (xQg, yQg−1) as inputs. The output is assigned to availableB. The variable qP$_{Y\_B}$ is derived. If one or more of the following conditions are true, qPY_B is set equal to qP$_{Y\_PREV}$: availableB is equal to FALSE or the coding tree block address ctbAddrB of the coding tree block containing the luma coding block covering the luma location (xQg, yQg−1) is not equal to CtbAddrInTs, where ctbAddrB is derived as follows:

xTmp=xQg>>Log 2 MinTrafoSize yTmp=(yQg−1)>>Log 2 MinTrafoSize minTbAddrB=MinTbAddrZs[xTmp][yTmp]

ctbAddrB=(minTbAddrB>>2)*(CtbLog 2 Size$_Y$–Log 2 MinTrafoSize)

Otherwise, qP$_{Y\_B}$ is set equal to the luma quantization parameter Qp$_Y$ of the coding unit containing the luma coding block covering (xQg, yQg−1).

The predicted luma quantization parameter qP$_{Y\_PRED}$ may be derived as follows:

qP$_{Y\_PRED}$=(qP$_{Y\_A}$+qP$_{Y\_B}$+1)>>1

The variable Qp$_Y$ may be derived as follows:

Qp$_Y$=((qP$_{Y\_PRED}$+CuQpDeltaVal+52+2*QpBdOffset$_Y$)%(52+QpBdOffset$_Y$))−QpBdOffset$_Y$ Qp$_Y$=Qp$_Y$+(color_transform_flag[xCb][yCb]?deltaQP$_{C0}$:0)

The luma quantization parameter Qp'$_Y$ may be derived as follows:

Qp'$_Y$=Qp$_Y$+QpBdOffset$_Y$

When ChromaArrayType is not equal to 0, the variables qPi$_{Cb}$ and qPi$_{Cr}$ may be derived as follows:

qPi$_{Cb}$=Clip3(−QpBdOffset$_C$,57,Qp$_Y$+pps_cb_qp_offset+slice_cb_qp_offset+CuQpOffset$_{Cb}$)

qPi$_{Cr}$=Clip3(−QpBdOffset$_C$,57,QpY+pps_cr_qp_offset+slice_cr_qp_offset+CuQpOffset$_{Cr}$)

If ChromaArrayType is equal to 1, the variables qP$_{Cb}$ and qP$_{Cr}$ may be set equal to the value of Qp$_C$ based on the index qPi equal to qPi$_{Cb}$ and qPi$_{Cr}$, respectively. Otherwise, the variables qP$_{Cb}$ and qP$_{Cr}$ may be set equal to Min(qPi, 51), based on the index qPi equal to qPi$_{Cb}$ and qPi$_{Cr}$, respectively. The chroma quantization parameters for the Cb and Cr components, Qp'$_{Cb}$ and Qp'$_{Cr}$, may be derived as follows:

Qp'$_{Cb}$=qP$_{Cb}$+QpBdOffset$_C$

Qp'$_{Cr}$=qP$_{Cr}$+QpBdOffset$_C$

The specification of Qp$_c$ as a function of qPi for ChromaArrayType equal to 1 may be as follows:

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| Qp$_c$ | =qPi | 29 | 30 | 31 | 32 | 33 | 33 | 34 | 34 | 35 | 35 | 36 | 36 | 37 | 37 | =qPi − 6 |

Qp'$_{Cb}$=Qp'$_{Cb}$+(color_transform_flag[x$_{Cb}$][y$_{Cb}$]?deltaQP$_{C1}$:0)

Qp'$_{Cr}$=QP'$_{Cr}$+(color_transform_flag[x$_{Cb}$][y$_{Cb}$]?deltaQP$_{C2}$:0)

In the de-quantization process, the quantization parameter qP for each component index (cIdx) may be derived as follows. If cIdx is equal to 0, qP=Qp'$_Y$+(color_transform_flag[xTbY][yTbY]?deltaQP$_{C0}$:0)

Otherwise, if cIdx is equal to 1, qP=Qp'$_{Cb}$+(color_transform_flag[xTbY][yTbY]?deltaQP$_{C1}$:0)

Otherwise (cIdx is equal to 2), qP=Qp'$_{Cr}$+(color_transform_flag[xTbY][yTbY]?deltaQP$_{C2}$:0)

In one example, deltaQP$_{C0}$, deltaQP$_{C1}$ and deltaQP$_{C2}$ may be set to −5, −5 and −3, respectively.

Figure 8:
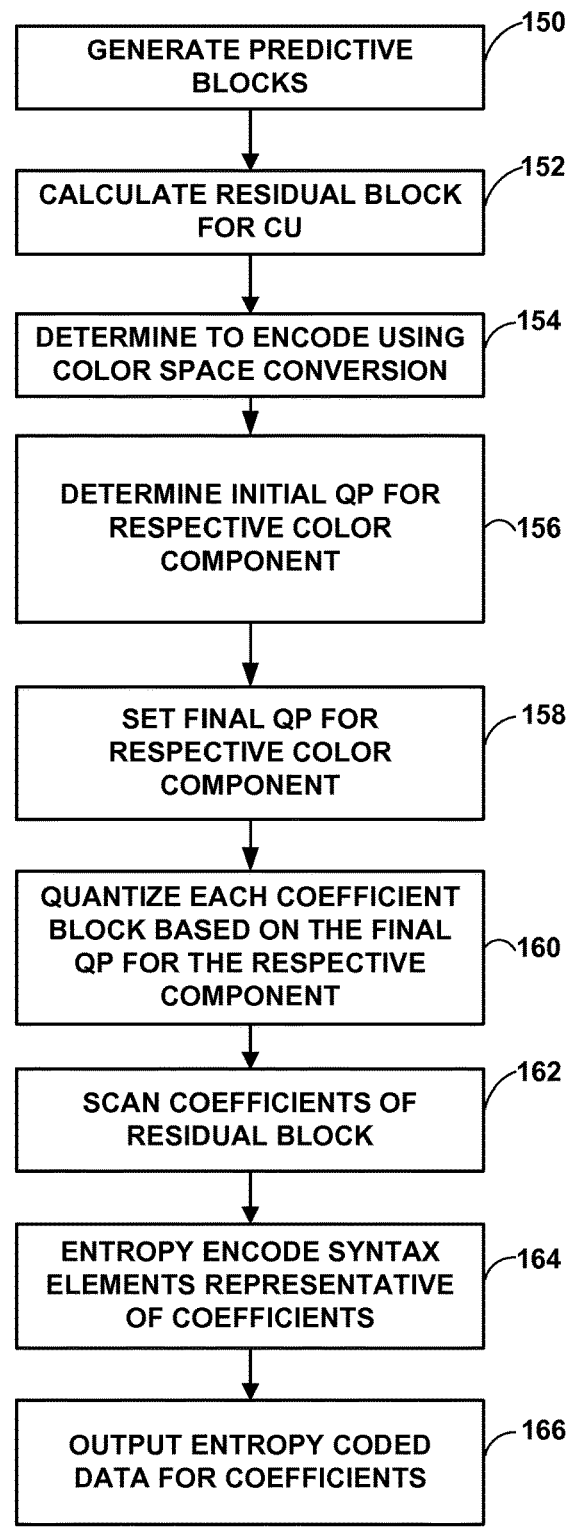
FIG. 8 is a flowchart illustrating an encoding technique according to one or more techniques of the current disclosure.

FIG. 8 is a flowchart illustrating an example method for encoding a current block, in accordance with a technique of this disclosure. The current block may comprise a current CU or a portion of the current CU. Although described with respect to video encoder 20 (FIGS. 1 and 6), it should be understood that other devices may be configured to perform a method similar to that of FIG. 8.

In this example, video encoder 20 initially generates one or more predictive blocks for PUs of the current CU (150). In some examples, video encoder 20 uses inter prediction, intra prediction, or intra BC prediction to generate the one or more predictive blocks. Video encoder 20 may then calculate one or more residual blocks for each TU of the current CU (152). Video encoder 20 may calculate a residual block for a TU of the current CU such that each respective sample value of the residual block is equal to a difference between a respective sample value of an original, unencoded coding block of the current CU and a corresponding respective sample value of a predictive block of a PU of the current CU.

Additionally, video encoder 20 may determine whether to encode the current CU using a color space conversion (154). For a respective color component of a plurality of color components (e.g., a luma component and one or more chroma components), video encoder 20 may determine a respective initial QP for the respective color component (156). Furthermore, video encoder 20 may set a final QP for the respective color component based on the current CU being encoded using the color space conversion such that the final QP for the respective color component is equal to a sum of the initial QP of the respective color component and a respective non-zero QP offset for the respective color component (158). In other words, in some examples, responsive to determining that the current CU is encoded using the color space conversion, video encoder 20 sets the final QP for the respective color component such that the final QP for the respective color component is equal to a sum of the initial QP of the respective color component and a respective non-zero QP offset for the respective color component. Video encoder 20 may quantize, based on the final QP for the respective color component, a respective coefficient block for the CU, the respective coefficient block for the CU being based on sample values of the respective color component (160).

Video encoder 20 may scan the quantized transform coefficients of the residual block (162). During the scan, or following the scan, video encoder 20 may entropy encode various syntax elements that represent the coefficients (164). For example, video encoder 20 may encode the syntax elements representing the coefficients using CAVLC or CABAC. Video encoder 20 may further output a video data bitstream comprising one or more entropy encoded syntax elements representative of each of the quantized coefficient blocks (166).

In some examples, for the color component, the QP offset for the color component may be signaled in one of a picture parameter set, a sequence parameter set, or a slice header. In some further examples, the plurality of color components may comprise three color components. In such examples, a first quantization parameter offset for a first quantization parameter for a first color component is equal to a second quantization parameter offset for a second quantization parameter for a second color component, the first quantization parameter offset (and the second quantization parameter offset) is less than a third quantization parameter offset for a third quantization parameter for a third color component. In some examples, a deblocking filtering process may be further performed on the CU. In such examples, video encoder 20 may use the initial QP for each color component rather than the final QP.

In some examples, the CU includes a plurality of color components which comprise a luma component and a chroma component. In such examples, video encoder 20 may further determine, based at least in part on the final QP for the luma component, a boundary strength of a luma edge. Video encoder 20 may further determine, based at least in part on the final QP for the chroma component, a boundary strength of a chroma edge. In response to determining that the boundary strength of the luma edge does not meet a first threshold, video encoder 20 may perform a deblocking filtering process on the luma edge. Further, in response to determining that the boundary strength of the chroma edge does not meet a second threshold, video encoder 20 may perform the deblocking filtering process on the chroma edge.

In some further examples, the CU is a first CU. In such examples, video encoder 20 may encode a second CU. In encoding the second CU, video encoder 20 may determine a second QP value based on the second CU not being encoded using the color space conversion, and quantize, based on the second QP value for the color component, a coefficient block of the second CU, the coefficient block of the second CU based on sample values of the color component. Video encoder 20 may further output the video data bitstream comprising a second set of one or more entropy encoded syntax elements representative of each of the quantized second coefficient blocks.

In some examples, for the color component, the QP offset for the color component is dependent on an encoding mode of the CU. In some such examples, for the color component, video encoder 20 may determine the QP offset for the component such that the QP offset is equal to a first value when the encoding mode of the CU is an intra mode or an intra block copy (BC) mode, and equal to a second value when the encoding mode of the CU is an inter mode, the first value being different from the second value. In other such examples, for the color component, video encoder 20 may determine the QP offset for the component such that the QP offset is equal to a first value when the encoding mode of the CU is an intra mode, and equal to a second value when the encoding mode of the CU is an intra block copy (BC) mode, the first value being different from the second value.

In some examples, the plurality of color components comprises three color components. In such examples, the quantization parameter offsets may be equal to (−5+6*BitInc, −5+6*BitInc, −3+6*BitInc). In other such examples, the quantization parameter offsets may be equal to other values, such as (−4+6*BitInc, −4+6*BitInc, −3+6*BitInc), (−4+6*BitInc, −4+6*BitInc, −2+6*BitInc), or (−5+6*BitInc, −5+6*BitInc, −2+6*BitInc). In any case, BitInc may be equal to 0, 1, or 2.

In some examples, for the color components, the QP offset for the color component may be dependent on whether a slice type of the CU an I-slice type, a P-slice type, or a B-slice type. In such examples, for the color component, video encoder 20 may determine that the QP offset for the color component is equal to a first value when the slice type of the CU is the I-slice type and equal to a second value when the slice type of the CU is the P-slice type or the B-slice type, the first value being different from the second value. In other such examples, for the color component of the plurality of color components, video encoder 20 may determine that the QP offset for the color component is equal to a first value when the slice type of the CU is the I-slice type, equal to a second value when the slice type of the CU is the P-slice type, and equal to a third value when the slice type of the CU is the B-slice type, the first value being different from the second value, the second value being different from the third value, and the first value being different from the third value.

In some examples, input data of the color space conversion has N-bit precision. In such examples, residual data for the CU after intra/inter prediction may be in a range of $[-2^N, 2^N-1]$. In some other examples, in response to determining that the CU is coded with an intra coding mode, video encoder 20 may further predict all chroma blocks of the CU using a same chroma prediction mode. In such examples, video encoder 20 may further predict all luma blocks of the CU using a same luma prediction mode. The same luma prediction mode may be the same as the same chroma prediction mode.

Figure 9:
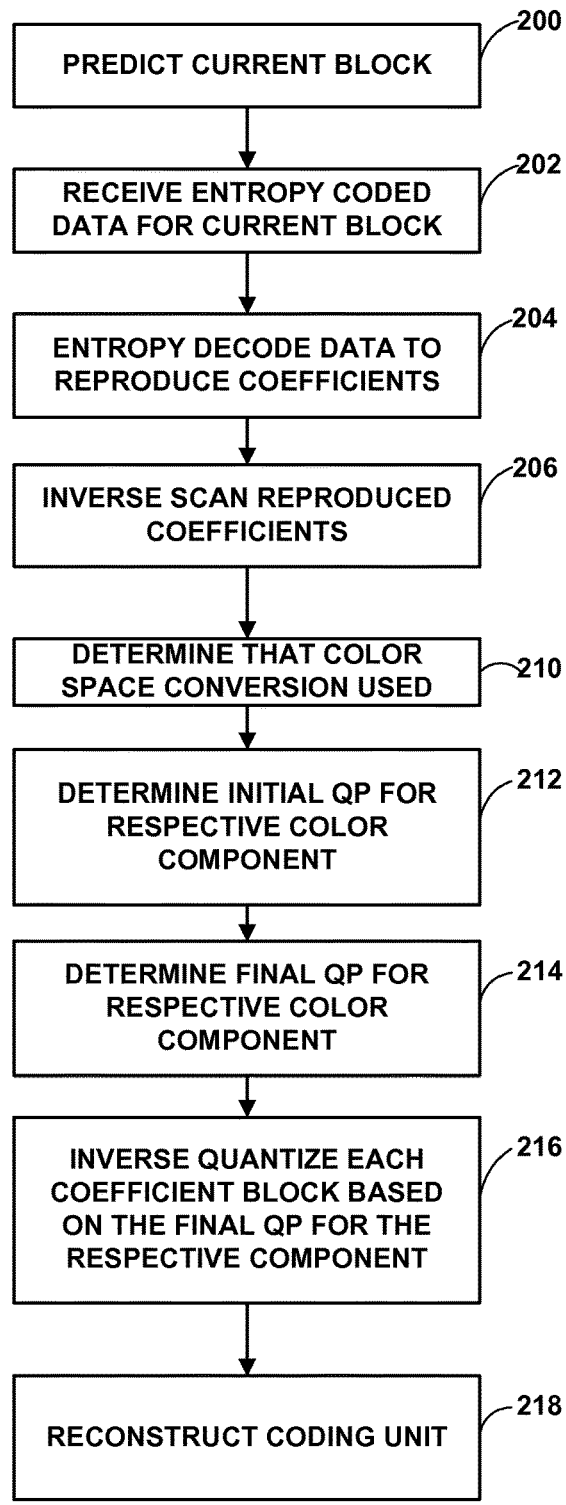
FIG. 9 is a flowchart illustrating a decoding technique according to one or more techniques of the current disclosure.

FIG. 9 is a flowchart illustrating an example method for decoding a current block of video data. This disclosure describes the example method of FIG. 9 with reference to a current CU. However, similar examples are possible with other types of video blocks. Furthermore, although described with respect to video decoder 30 (FIGS. 1 and 7), it should be understood that other devices may be configured to perform a method similar to that of FIG. 9.

Video decoder 30 may generate one or more predictive blocks for PUs of the current CU (200), e.g., using an intra- or inter-prediction mode to calculate a predicted block for the CU. Video decoder 30 may also receive entropy encoded syntax elements representing transform coefficients of transform coefficient blocks of TUs of the current CU (202). Video decoder 30 may entropy decode the entropy encoded data to reconstruct the transform coefficients of the transform coefficient blocks of the TUs of the current CU (204). Video decoder 30 may then inverse scan the reconstructed transform coefficients to recreate the transform coefficient blocks of the TUs of the current CU (206).

Video decoder 30 may determine that the CU was encoded using a color space conversion (210). For a color component of a plurality of color components, video decoder 30 may determine an initial QP for the color component (212). Additionally, video decoder 30 may determine, based on the current CU being encoded using the color space conversion, a final QP for the color component such that the final QP for the color component is equal to a sum of the initial QP of the color component and a non-zero QP offset for the color component (214). For instance, in response to the current CU being encoded using the color space conversion, video decoder 30 may set the final QP for the color component such that the final QP for the color component is equal to a sum of the initial QP of the color component and a non-zero QP offset for the color component. Video decoder 30 may inverse quantize, based on the final QP for the color component, a coefficient block for the current CU, the coefficient block for the current CU being based on sample values of the color component (216). Once each coefficient block has been inverse quantized, video decoder 30 may reconstruct the current CU based on the inverse quantized coefficient blocks for the current CU (218).

In some examples, for the color component of the one or more color components, the QP offset for the color component may be signaled in one of a picture parameter set, a sequence parameter set, or a slice header. In some further examples, the plurality of color components may comprise three color components. In such examples, a first quantization parameter offset for a first quantization parameter for a first color component is equal to a second quantization parameter offset for a second quantization parameter for a second color component, the first quantization parameter offset (and the second quantization parameter offset) is less than a third quantization parameter offset for a third quantization parameter for a third color component. In some examples, a deblocking filtering process may be further performed on the CU. In such examples, video decoder 30 may use the initial QP for each color component rather than the final QP.

In some examples, the plurality of color components comprises a luma component and a chroma component. In such examples, video decoder 30 may further determine, based at least in part on the final QP for the luma component, a boundary strength of a luma edge. Video decoder 30 may further determine, based at least in part on the final QP for the chroma component, a boundary strength of a chroma edge. In response to determining that the boundary strength of the luma edge does not meet a first threshold, video decoder 30 may perform a deblocking filtering process on the luma edge. Further, in response to determining that the boundary strength of the chroma edge does not meet a second threshold, video decoder 30 may perform the deblocking filtering process on the chroma edge.

In some further examples, the CU is a first CU. In such examples, video decoder 30 may decode a second CU. In decoding the second CU, video decoder 30 may, for the color component, determine a QP for the color components, determine a final QP value for the color component based on the second CU not being encoded using the color space conversion such that the final QP value for the color component is equal to the initial QP value of the color component, and inverse quantize, based on the final QP for the color component, a coefficient block of the second CU, the coefficient block of the second CU based on sample values of the color component. Video decoder 30 may further reconstruct the second CU based on each of the one or more inverse quantized coefficient blocks of the second CU.

In some examples, for the color component, the QP offset for the color component is dependent on an encoding mode of the CU. In some such examples, for the color component, video decoder 30 may determine the QP offset for the component such that the QP offset is equal to a first value when the encoding mode of the CU is an intra mode or an intra BC mode, and equal to a second value when the encoding mode of the CU is an inter mode, the first value being different from the second value. In other such examples, for the color component, video decoder 30 may determine the QP offset for the component such that the QP offset is equal to a first value when the encoding mode of the CU is an intra mode, and equal to a second value when the encoding mode of the CU is an intra BC mode, the first value being different from the second value.

In some examples, the plurality of color components comprises three color components. In such examples, the quantization parameter offsets may be equal to (−5+6*BitInc, −5+6*BitInc, −3+6*BitInc). In other such examples, the quantization parameter offsets may be equal to other values, such as (−4+6*BitInc, −4+6*BitInc, −3+6*BitInc), (−4+6*BitInc, −4+6*BitInc, −2+6*BitInc), or (−5+6*BitInc, −5+6*BitInc, −2+6*BitInc). In any case, BitInc may be equal to 0, 1, or 2.

In some examples, for the color components, the QP offset for the color component may be dependent on whether a slice type of the CU an I-slice type, a P-slice type, or a B-slice type. In such examples, for the color component, video decoder 30 may determine that the QP offset for the color component is equal to a first value when the slice type of the CU is the I-slice type and equal to a second value when the slice type of the CU is the P-slice type or the B-slice type, the first value being different from the second value. In other such examples, for the color component, video decoder 30 may determine that the QP offset for the color component is equal to a first value when the slice type of the CU is the I-slice type, equal to a second value when the slice type of the CU is the P-slice type, and equal to a third value when the slice type of the CU is the B-slice type, the first value being different from the second value, the second value being different from the third value, and the first value being different from the third value.

In some examples, input data of the color space conversion has N-bit precision. In such examples, residual data for the CU after intra/inter prediction may be in a range of $[-2^N, 2^N-1]$. In some other examples, in response to determining that the CU is coded with an intra coding mode, video decoder 30 may further predict all chroma blocks of the CU using a same chroma prediction mode. In such examples, video decoder 30 may further predict all luma blocks of the CU using a same luma prediction mode. The same luma prediction mode may be the same as the same chroma prediction mode.

Figure 10:
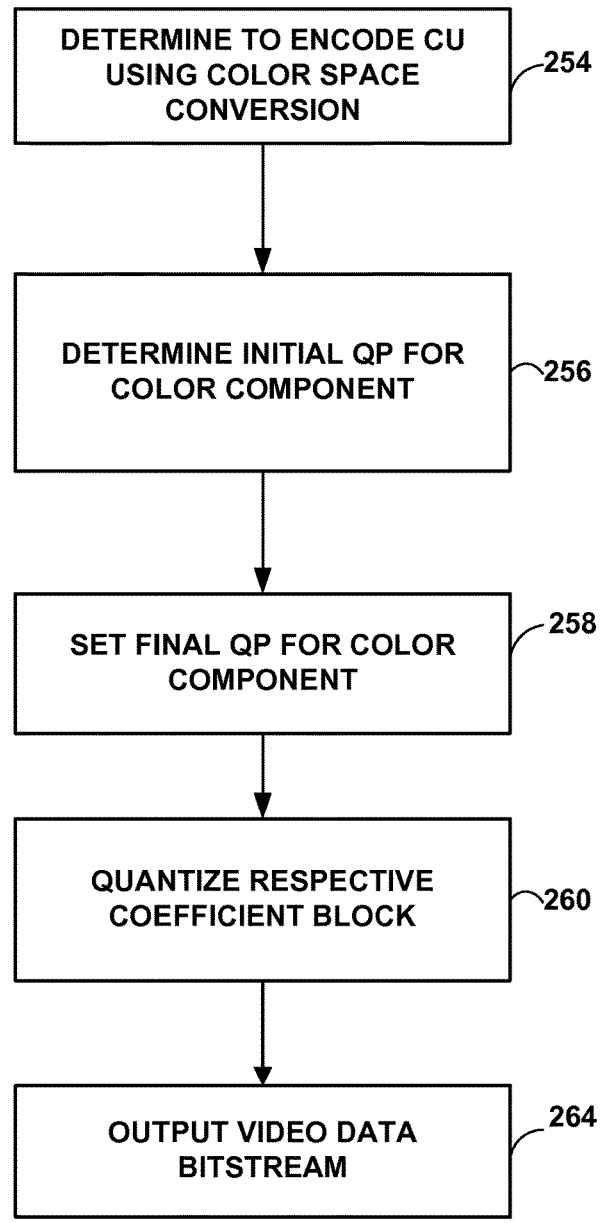
FIG. 10 is a flowchart illustrating an encoding technique according to one or more techniques of the current disclosure.

FIG. 10 is a flowchart illustrating an example method for encoding a CU, in accordance with a technique of this disclosure. The current block may comprise a current CU or a portion of the current CU. Although described with respect to video encoder 20 (FIGS. 1 and 2), it should be understood that other devices may be configured to perform a method similar to that of FIG. 10.

In encoding the CU, video encoder 20 may determine whether to encode the current CU using a color space conversion (254). For a color component (e.g., a luma component or a chroma component), video encoder 20 may determine an initial QP for the color component (256). Furthermore, video encoder 20 may set a final QP for the color component based on the current CU being encoded using the color space conversion such that the final QP for the color component is equal to a sum of the initial QP of the color component and a non-zero QP offset for the color component (258). In other words, in some examples, responsive to determining that the current CU is encoded using the color space conversion, video encoder 20 sets the final QP for the color component such that the final QP for the color component is equal to a sum of the initial QP of the color component and a non-zero QP offset for the color component. Video encoder 20 may quantize, based on the final QP for the color component, a coefficient block for the CU, the coefficient block for the CU being based on sample values of the color component (260). Video encoder 20 may further output a video data bitstream comprising one or more entropy encoded syntax elements representative of each of the quantized coefficient blocks (266).

Figure 11:
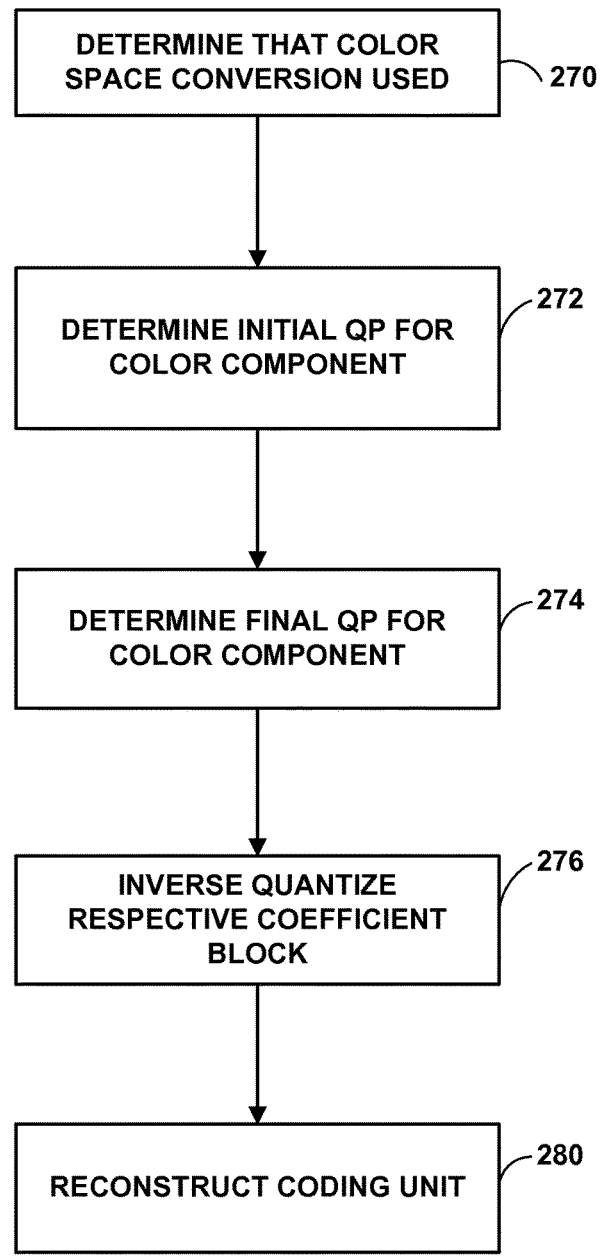
FIG. 11 is a flowchart illustrating a decoding technique according to one or more techniques of the current disclosure.

FIG. 11 is a flowchart illustrating an example method for decoding a CU of video data. This disclosure describes the example method of FIG. 9 with reference to a current CU. However, similar examples are possible with other types of video blocks. Furthermore, although described with respect to video decoder 30 (FIGS. 1 and 7), it should be understood that other devices may be configured to perform a method similar to that of FIG. 11.

In decoding the CU, video decoder 30 may determine that the CU was encoded using a color space conversion (270). Video decoder 30 may determine an initial QP for a color component (272). Additionally, video decoder 30 may determine, based on the current CU being encoded using the color space conversion, a final QP for the color component such that the final QP for the color component is equal to a sum of the initial QP of the color component and a non-zero QP offset for the color component (274). For instance, in response to the current CU being encoded using the color space conversion, video decoder 30 may set the final QP for the color component such that the final QP for the color component is equal to a sum of the initial QP of the color component and a non-zero QP offset for the color component. Video decoder 30 may inverse quantize, based on the final QP for the color component, a coefficient block for the current CU, the coefficient block for the current CU being based on sample values of the color component (276). Video decoder 30 may reconstruct the current CU based on the inverse quantized coefficient blocks for the current CU (280).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware Various examples of the disclosure have been described. Any combination of the described systems, operations, or functions is contemplated. These and other examples are within the scope of the following claims.

The invention claimed is:

1. A method of decoding video data, the method comprising:
   determining an initial quantization parameter (QP) for a luma component;
   for a coding unit (CU) of the video data encoded with a color space transform enabled, setting a final QP for the luma component such that the final QP for the luma component is equal to a sum of the initial QP of the luma component and a non-zero QP offset for the luma component;

inverse quantizing, based on the final QP for the luma component, a coefficient block for the CU, the coefficient block for the CU being based on sample values of the luma component;

applying an inverse transform to the coefficient block to produce a residual block;

forming a decoded video block by summing the residual block and a predictive block;

determining a boundary strength of a luma edge of the decoded video block, wherein the boundary strength of the luma edge is dependent on the final QP for the luma component; and based on the boundary strength of the luma edge not meeting a first threshold, performing a deblocking filtering process on the luma edge.

2. The method of claim 1, wherein the QP offset for the luma component is signaled in one of: a picture parameter set, a sequence parameter set, and a slice header.

3. The method of claim 1, wherein the luma component is a first color component of a plurality of color components, wherein the QP offset is a first QP offset, wherein the QP is a first QP, and wherein the first QP offset for the first QP for the first color component is equal to a second QP offset for a second QP for a second color component and wherein the first QP offset is less than a third QP offset for a third QP for a third color component.

4. The method of claim 1, further comprising:
determining an initial QP for a chroma component;
setting a final QP for the chroma component such that the final QP for the chroma component is equal to a sum of the initial QP of the chroma component and a non-zero QP offset for the chroma component; and
as part of performing the deblocking filter process, determining a boundary strength of a chroma edge of the decoded video block, wherein the boundary strength for the chroma edge is dependent on the final QP for the chroma component.

5. The method of claim 1, wherein the CU is a first CU, the method further comprising:
determining a second QP for a luma component of a second CU not encoded with the color space transform enabled;
inverse quantizing, based on the second QP for the luma component, a coefficient block of the second CU, the coefficient block of the second CU based on sample values of the luma component; and
reconstructing the second CU based on each of the one or more inverse quantized coefficient blocks of the second CU.

6. The method of claim 1, further comprising selecting different QP offsets for the luma component depending on an encoding mode of the CU.

7. The method of claim 6, further comprising determining the QP offset for the luma component such that the QP offset for the luma component is equal to a first value when the encoding mode of the CU is an intra mode or an intra block copy (BC) mode, and equal to a second value when the encoding mode of the CU is an inter mode, the first value being different from the second value.

8. The method of claim 6, further comprising determining the QP offset for the component such that the QP offset for the luma component is equal to a first value when the encoding mode of the CU is an intra mode, and equal to a second value when the encoding mode of the CU is an intra block copy (BC) mode or an inter mode, the first value being different from the second value.

9. The method of claim 1, wherein the luma component is a first color component of a plurality of color components, wherein the plurality of color components comprises three color components, wherein respective QP offsets are associated with each of the three color components, and wherein the respective QP offsets are equal to (−5+6*BitInc, −5+6*BitInc, −3+6*BitInc), wherein BitInc is equal to one of 0, 1, or 2.

10. The method of claim 1, wherein the QP offset for the luma component is dependent on whether a slice type of the CU an I-slice type, a P-slice type, or a B-slice type.

11. The method of claim 10, further comprising:
determining the QP offset for the luma component is equal to a first value when the slice type of the CU is the I-slice type and equal to a second value when the slice type of the CU is the P-slice type or the B-slice type, the first value being different from the second value.

12. The method of claim 10, further comprising:
determining the QP offset for the luma component is equal to a first value when the slice type of the CU is the I-slice type, equal to a second value when the slice type of the CU is the P-slice type, and equal to a third value when the slice type of the CU is the B-slice type, the first value being different from the second value, the second value being different from the third value, and the first value being different from the third value.

13. The method of claim 1, wherein input data of the color space transform has N-bit precision, and residual data for the CU after intra/inter prediction is in a range of $[-2^N, 2^N-1]$, wherein the residual data includes the residual block, the method further comprising:
after performing the color space transform to produce transformed residual data, clipping the transformed residual data such that the transformed residual data is within the range.

14. The method of claim 1, further comprising:
determining whether the CU is coded with an intra coding mode and in response to determining that the CU is coded with the intra coding mode:
predicting all chroma blocks of the CU using a same chroma prediction mode based on intra-prediction mode indicators;
based on the CU having only one prediction unit (PU), predicting all luma blocks of the CU using a same luma prediction mode, wherein the same luma prediction mode is the same as the same chroma prediction mode; and
based on the CU having a plurality of PUs, predicting a first luma block of a first PU of the plurality of PUs using the same luma prediction mode.

15. A device for decoding video data, the device comprising:
a memory configured to store the video data; and
one or more processors configured to:
determine an initial quantization parameter (QP) for a luma component;
for a coding unit (CU) of the video data encoded with a color space transform enabled, set a final QP for the luma component such that the final QP for the luma component is equal to a sum of the initial QP of the luma component and a non-zero QP offset for the luma component;
inverse quantize, based on the final QP for the luma component, a coefficient block for the CU, the coefficient block for the CU being based on sample values of the luma component;
apply an inverse transform to the coefficient block to produce a residual block;
form a decoded video block by summing the residual block and a predictive block;
determine a boundary strength of a luma edge of the decoded video block, wherein the boundary strength of the luma edge is dependent on the final QP for the luma component; and
based on the boundary strength of the luma edge not meeting a first threshold, perform a deblocking filtering process on the luma edge.

16. The device of claim 15, wherein the QP offset for the luma component is signaled in one of: a picture parameter set, a sequence parameter set, and a slice header.

17. The device of claim 15, wherein the luma component is a first color component of a plurality of color components, wherein the QP offset is a first QP offset, wherein the QP is a first QP, and wherein the first QP offset for the first QP for the first color component is equal to a second QP offset for a second QP for a second color component and wherein the first QP offset is less than a third QP offset for a third QP for a third color component.

18. The device of claim 15, wherein the one or more processors are further configured to:
determine an initial QP for a chroma component;
set a final QP for the chroma component such that the final QP for the chroma component is equal to a sum of the initial QP of the chroma component and a non-zero QP offset for the chroma component; and
as part of performing the deblocking filter process, determine a boundary strength of a chroma edge of the decoded video block, wherein the boundary strength for the chroma edge is dependent on the final QP for the chroma component.

19. The device of claim 15, wherein the CU is a first CU, wherein the one or more processors are further configured to:
determine a second QP for a luma component of a second CU not encoded with the color space transform enabled;
inverse quantize, based on the second QP for the luma component, a coefficient block of the second CU, the coefficient block of the second CU based on sample values of the luma component; and
reconstruct the second CU based on each of the one or more inverse quantized coefficient blocks of the second CU.

20. The device of claim 15, wherein the QP offset for the luma component is dependent on an encoding mode of the CU.

21. The device of claim 20, wherein the one or more processors are further configured to determine the QP offset for the luma component such that the QP offset for the luma component is equal to a first value when the encoding mode of the CU is an intra mode or an intra block copy (BC) mode, and equal to a second value when the encoding mode of the CU is an inter mode, the first value being different from the second value.

22. The device of claim 20, wherein the one or more processors are further configured to determine the QP offset for the component such that the QP offset for the luma component is equal to a first value when the encoding mode of the CU is an intra mode, and equal to a second value when the encoding mode of the CU is an intra block copy (BC) mode or an inter mode, the first value being different from the second value.

23. The device of claim 15, wherein the luma component is a first color component of a plurality of color components, wherein the plurality of color components comprises three color components, wherein respective QP offsets are associated with each of the three color components, and wherein the respective QP offsets are equal to (−5+6*BitInc, −5+6*BitInc, −3+6*BitInc), wherein BitInc is equal to one of 0, 1, or 2.

24. The device of claim 15, wherein the QP offset for the luma component is dependent on whether a slice type of the CU an I-slice type, a P-slice type, or a B-slice type.

25. The device of claim 24, wherein the one or more processors are further configured to:
determine the QP offset for the luma component is equal to a first value when the slice type of the CU is the I-slice type and equal to a second value when the slice type of the CU is the P-slice type or the B-slice type, the first value being different from the second value.

26. The device of claim 24, wherein the one or more processors are further configured to:
determine the QP offset for the luma component is equal to a first value when the slice type of the CU is the I-slice type, equal to a second value when the slice type of the CU is the P-slice type, and equal to a third value when the slice type of the CU is the B-slice type, the first value being different from the second value, the second value being different from the third value, and the first value being different from the third value.

27. The device of claim 15, wherein input data of the color space transform has N-bit precision, and residual data for the CU after intra/inter prediction is in a range of $[-2^N, 2^N-1]$, wherein the residual data includes the residual block, wherein the one or more processors are further configured to:
after performing the color space transform to produce transformed residual data, clip the transformed residual data such that the transformed residual data is within the range.

28. The device of claim 15, wherein the one or more processors are further configured to:
in response to determining the CU is coded with an intra coding mode:
predict all chroma blocks of the CU using a same chroma prediction mode;
based on the CU having only one prediction unit (PU), predict all luma blocks of the CU using a same luma prediction mode, wherein the same luma prediction mode is the same as the same chroma prediction mode; and
based on the CU having a plurality of PUs, predict a first luma block of a first PU of the plurality of PUs using the same luma prediction mode.

29. The device of claim 15, wherein the device comprises at least one of:
an integrated circuit;
a microprocessor; or
a wireless communication device.

30. The device of claim 15, further comprising a display configured to display decoded pictures of the video data.

31. A device for decoding video data, the device comprising:
means for determining an initial quantization parameter (QP) for a luma component;

for a coding unit (CU) of the video data encoded with a color space transform enabled, means for setting a final QP for the luma component such that the final QP for the luma component is equal to a sum of the initial QP of the luma component and a non-zero QP offset for the luma component;

means for inverse quantizing, based on the final QP for the luma component, a coefficient block for the CU, the coefficient block for the CU being based on sample values of the luma component;

means for applying an inverse transform to the coefficient block to produce a residual block;

means for forming a decoded video block by summing the residual block and a predictive block;

means for determining a boundary strength of a luma edge of the decoded video block, wherein the boundary strength of the luma edge is dependent on the final QP for the luma component; and based on the boundary strength of the luma edge not meeting a first threshold, means for performing a deblocking filtering process on the luma edge.

32. The device of claim 31, wherein the QP offset for the luma component is signaled in one of: a picture parameter set, a sequence parameter set, and a slice header.

33. The device of claim 31, wherein the luma component is a first color component of a plurality of color components, wherein the plurality of color components comprises three color components, wherein respective QP offsets are associated with each of the three color components, and wherein the respective QP offsets are equal to (−5+6*BitInc, −5+6*BitInc, −3+6*BitInc), wherein BitInc is equal to one of 0, 1, or 2.

34. The device of claim 31, further comprising:
in response to determining the CU is coded with an intra coding mode:
means for predicting all chroma blocks of the CU using a same chroma prediction mode; and
based on the CU having only one prediction unit (PU), means for predicting all luma blocks of the CU using a same luma prediction mode, wherein the same luma prediction mode is the same as the same chroma prediction mode; and
based on the CU having a plurality of PUs, means for predicting a first luma block of a first PU of the plurality of PUs using the same luma prediction mode.

35. A computer-readable storage medium encoded with instructions that, when executed, cause one or more processors to:
determine an initial quantization parameter (QP) for a luma component;
for a coding unit (CU) of the video data encoded with a color space transform enabled, set a final QP for the luma component such that the final QP for the luma component is equal to a sum of the initial QP of the luma component and a non-zero QP offset for the luma component;
inverse quantize, based on the final QP for the luma component, a coefficient block for the CU, the coefficient block for the CU being based on sample values of the luma component;
apply an inverse transform to the coefficient block to produce a residual block;
form a decoded video block by summing the residual block and a predictive block;

determine a boundary strength of a luma edge of the decoded video block, wherein the boundary strength of the luma edge is dependent on the final QP for the luma component; and based on the boundary strength of the luma edge not meeting a first threshold, perform a deblocking filtering process on the luma edge.

36. The computer-readable storage medium of claim 35, wherein the QP offset for the luma component is signaled in one of: a picture parameter set, a sequence parameter set, and a slice header.

37. The computer-readable storage medium of claim 35, wherein the luma component is a first color component of a plurality of color components, wherein the plurality of color components comprises three color components, wherein respective QP offsets are associated with each of the three color components, and wherein the respective QP offsets are equal to (−5+6*BitInc, −5+6*BitInc, −3+6*BitInc), wherein BitInc is equal to one of 0, 1, or 2.

38. The computer-readable storage medium of claim 35, wherein the instructions further cause the one or more processors to:
in response to determining the CU is coded with an intra coding mode:
predict all chroma blocks of the CU using a same chroma prediction mode; and
based on the CU having only one prediction unit (PU), predicting all luma blocks of the CU using a same luma prediction mode, wherein the same luma prediction mode is the same as the same chroma prediction mode; and
based on the CU having a plurality of PUs, predicting a first luma block of a first PU of the plurality of PUs using the same luma prediction mode.

39. A method of encoding video data, the method comprising:
determining an initial quantization parameter (QP) for a luma component;
for a coding unit (CU) of the video data encoded with a color space transform enabled, setting a final QP for the luma component such that the final QP for the luma component is equal to a sum of the initial QP of the luma component and a non-zero QP offset for the luma component;
quantizing, based on the final QP for the luma component, a coefficient block for the CU, the coefficient block for the CU being based on sample values of the luma component;
applying a transform to the coefficient block to produce a residual block;
determining a boundary strength of a luma edge of the encoded video block, wherein the boundary strength of the luma edge is dependent on the final QP for the luma component; and
based on the boundary strength of the luma edge not meeting a first threshold, performing a deblocking filtering process on the luma edge; and
encoding the residual block in a video data bitstream.

40. The method of claim 39, wherein the QP offset for the luma component is signaled in one of: a picture parameter set, a sequence parameter set, and a slice header.

41. The method of claim 39, wherein the luma component is a first color component of a plurality of color components, wherein the QP offset is a first QP offset, wherein the QP is a first QP, and wherein the first QP offset for the first QP for the first color component is equal to a second QP offset for a second QP for a second color component and wherein the first QP offset is less than a third QP offset for a third QP for a third color component.

42. The method of claim 39, further comprising:
   determining an initial QP for a chroma component;
   setting a final QP for the chroma component such that the final QP for the chroma component is equal to a sum of the initial QP of the chroma component and a non-zero QP offset for the chroma component; and
   as part of performing the deblocking filter process, determining a boundary strength of a chroma edge of the encoded video block, wherein the boundary strength for the chroma edge is dependent on the final QP for the chroma component.

43. The method of claim 39, wherein the CU is a first CU, the method further comprising:
   determining a second QP for a luma component of a second CU not encoded with the color space transform enabled;
   quantizing, based on the second QP for the luma component, a coefficient block of the second CU, the coefficient block of the second CU based on sample values of the luma component; and
   outputting the video data bitstream comprising a second set of one or more entropy encoded syntax elements representative of each of the quantized second coefficient blocks.

44. The method of claim 39, wherein the QP offset for the luma component is dependent on an encoding mode of the CU.

45. The method of claim 44, further comprising determining the QP offset for the luma component such that the QP offset for the luma component is equal to a first value when the encoding mode of the CU is an intra mode or an intra block copy (BC) mode, and equal to a second value when the encoding mode of the CU is an inter mode, the first value being different from the second value.

46. The method of claim 44, further comprising determining the QP offset for the component such that the QP offset for the luma component is equal to a first value when the encoding mode of the CU is an intra mode, and equal to a second value when the encoding mode of the CU is an intra block copy (BC) mode or an inter mode, the first value being different from the second value.

47. The method of claim 39, wherein the luma component is a first color component of a plurality of color components, wherein the plurality of color components comprises three color components, wherein respective QP offsets are associated with each of the three color components, and wherein the respective QP offsets are equal to (−5+6*BitInc, −5+6*BitInc, −3+6*BitInc), wherein BitInc is equal to one of 0, 1, or 2.

48. The method of claim 39, wherein, for the luma component, the QP offset for the color component is dependent on whether a slice type of the CU an I-slice type, a P-slice type, or a B-slice type.

49. The method of claim 39, wherein input data of the color space transform has N-bit precision, and residual data for the CU after intra/inter prediction is in a range of $[-2^N, 2^N-1]$, wherein the residual data includes the residual block, the method further comprising:
   after performing the color space transform to produce transformed residual data, clipping the transformed residual data such that the transformed residual data is within the range.

50. The method of claim 39, further comprising:
   in response to determining the CU is coded with an intra coding mode:
      predicting all chroma blocks of the CU using a same chroma prediction mode;
      based on the CU having only one prediction unit (PU), predicting all luma blocks of the CU using a same luma prediction mode, wherein the same luma prediction mode is the same as the same chroma prediction mode; and
      based on the CU having a plurality of PUs, predicting a first luma block of a first PU of the plurality of PUs using the same luma prediction mode.

51. A device for encoding video data, the device comprising:
   a data storage medium configured to store the video data; and
   one or more processors configured to:
      determine an initial quantization parameter (QP) for a luma component;
      for a coding unit (CU) of the video data encoded with a color space transform enabled, set a final QP for the luma component such that the final QP for the luma component is equal to a sum of the initial QP of the luma component and a non-zero QP offset for the luma component;
      quantize, based on the final QP for the luma component, a coefficient block for the CU, the coefficient block for the CU being based on sample values of the luma component;
      apply a transform to the coefficient block to produce a residual block;
      determining a boundary strength of a luma edge of the encoded video block, wherein the boundary strength of the luma edge is dependent on the final QP for the luma component; and
      based on the boundary strength of the luma edge not meeting a first threshold, performing a deblocking filtering process on the luma edge; and
      encode the residual block in a video data bitstream.

52. The device of claim 51, wherein the QP offset for the luma component is signaled in one of: a picture parameter set, a sequence parameter set, and a slice header.

53. The device of claim 51, wherein the luma component is a first color component of a plurality of color components, wherein the QP offset is a first QP offset, wherein the QP is a first QP, and wherein the first QP offset for the first QP for the first color component is equal to a second QP offset for a parameter QP for a second color component and wherein the first QP offset is less than a third QP offset for a third QP for a third color component.

54. The device of claim 51, wherein the one or more processors are further configured to:
   determine an initial QP for a chroma component;
   set a final QP for the chroma component such that the final QP for the chroma component is equal to a sum of the initial QP of the chroma component and a non-zero QP offset for the chroma component; and
   as part of performing the deblocking filter process, determine a boundary strength of a chroma edge of the encoded video block, wherein the boundary strength for the chroma edge is dependent on the final QP for the chroma component.

55. The device of claim 51, wherein the CU is a first CU, wherein the one or more processors are further configured to:

determine a second QP for a luma component of a second CU not encoded with the color space transform enabled;

quantize, based on the second QP for the luma component, a coefficient block of the second CU, the coefficient block of the second CU based on sample values of the luma component; and output the video data bitstream comprising a second set of one or more entropy encoded syntax elements representative of each of the quantized second coefficient blocks.

56. The device of claim 51, wherein the QP offset for the luma component is dependent on an encoding mode of the CU.

57. The device of claim 56, wherein the one or more processors are further configured to determine the QP offset for the luma component such that the QP offset for the luma component is equal to a first value when the encoding mode of the CU is an intra mode or an intra block copy (BC) mode, and equal to a second value when the encoding mode of the CU is an inter mode, the first value being different from the second value.

58. The device of claim 56, wherein the one or more processors are further configured to determine the QP offset for the component such that the QP offset for the luma component is equal to a first value when the encoding mode of the CU is an intra mode, and equal to a second value when the encoding mode of the CU is an intra block copy (BC) mode or an inter mode, the first value being different from the second value.

59. The device of claim 51, wherein the luma component is a first color component of a plurality of color components, wherein the plurality of color components comprises three color components, wherein respective QP offsets are associated with each of the three color components, and wherein the respective QP offsets are equal to (−5+6*BitInc, −5+6*BitInc, −3+6*BitInc), wherein BitInc is equal to one of 0, 1, or 2.

60. The device of claim 51, wherein the one or more processors are further configured to:
determine the QP offset for the luma component is equal to a first value when the slice type of the CU is the I-slice type, equal to a second value when the slice type of the CU is the P-slice type, and equal to a third value when the slice type of the CU is the B-slice type, the first value being different from the second value, the second value being different from the third value, and the first value being different from the third value.

61. The device of claim 51, wherein input data of the color space transform has N-bit precision, and residual data for the CU after intra/inter prediction is in a range of [−2$^N$, 2$^N$−1], wherein the residual data includes the residual block, wherein the one or more processors are further configured to:
after performing the color space transform to produce transformed residual data, clip the transformed residual data such that the transformed residual data is within the range.

62. The device of claim 51, wherein the one or more processors are further configured to:
in response to determining the CU is coded with an intra coding mode:
predict all chroma blocks of the CU using a same chroma prediction mode;
based on the CU having only one prediction unit (PU), predict all luma blocks of the CU using a same luma prediction mode, wherein the same luma prediction mode is the same as the same chroma prediction mode; and
based on the CU having a plurality of PUs, predict a first luma block of a first PU of the plurality of PUs using the same luma prediction mode.

63. The device of claim 51, wherein the device comprises at least one of:
an integrated circuit;
a microprocessor; or
a wireless communication device.

64. The device of claim 51, further comprising a camera configured to capture the video data.

65. A device for encoding video data, the device comprising:
means for determining an initial quantization parameter (QP) for a luma component;
for a coding unit (CU) of the video data encoded with a color space transform enabled, means for setting a final QP for the luma component such that the final QP for the luma component is equal to a sum of the initial QP of the luma component and a non-zero QP offset for the luma component;
means for quantizing, based on the final QP for the luma component, a coefficient block for the CU, the coefficient block for the CU being based on sample values of the luma component;
means for applying a transform to the coefficient block to produce a residual block;
means for determining a boundary strength of a luma edge of the encoded video block, wherein the boundary strength of the luma edge is dependent on the final QP for the luma component; and
based on the boundary strength of the luma edge not meeting a first threshold, means for performing a deblocking filtering process on the luma edge; and
means for encoding the residual block in a video data bitstream.

66. A computer-readable storage medium encoded with instructions that, when executed, cause one or more processors to:
determine an initial quantization parameter (QP) for a luma component;
for a coding unit (CU) of the video data encoded with a color space transform enabled, set a final QP for the luma component such that the final QP for the luma component is equal to a sum of the initial QP of the luma component and a non-zero QP offset for the luma component;
quantize, based on the final QP for the luma component, a coefficient block for the CU, the coefficient block for the CU being based on sample values of the luma component;
apply a transform to the coefficient block to produce a residual block;
determining a boundary strength of a luma edge of the encoded video block, wherein the boundary strength of the luma edge is dependent on the final QP for the luma component; and
based on the boundary strength of the luma edge not meeting a first threshold, performing a deblocking filtering process on the luma edge; and
encode the residual block in a video data bitstream.

* * * * *